(12) United States Patent
Coutinho et al.

(10) Patent No.: US 10,342,067 B2
(45) Date of Patent: Jul. 2, 2019

(54) SYSTEMS AND METHODS FOR VEHICULAR POSITIONING BASED ON WIRELESS FINGERPRINTING DATA IN A NETWORK OF MOVING THINGS INCLUDING, FOR EXAMPLE, AUTONOMOUS VEHICLES

(71) Applicant: Veniam, Inc., Mountain View, CA (US)

(72) Inventors: Nuno Alexandre Tavares Coutinho, Oporto (PT); Daniel Cardoso de Moura, Vila Nova de Gaia (PT)

(73) Assignee: Veniam, Inc., Mountain View, CA (US)

(*) Notice: Subject to any disclaimer, the term of this patent is extended or adjusted under 35 U.S.C. 154(b) by 0 days.

(21) Appl. No.: 15/647,234

(22) Filed: Jul. 11, 2017

(65) Prior Publication Data

US 2018/0014351 A1  Jan. 11, 2018

Related U.S. Application Data

(60) Provisional application No. 62/360,592, filed on Jul. 11, 2016.

(51) Int. Cl.
| | | |
|---|---|---|
| *H04W 84/00* | (2009.01) | |
| *H04W 84/06* | (2009.01) | |
| *H04B 7/185* | (2006.01) | |
| *H04W 88/16* | (2009.01) | |
| *H04W 24/02* | (2009.01) | |

(52) U.S. Cl.
CPC ........ *H04W 84/06* (2013.01); *H04B 7/18554* (2013.01); *H04W 84/005* (2013.01); *H04W 88/16* (2013.01); *B64C 2201/122* (2013.01); *H04W 24/02* (2013.01)

(58) Field of Classification Search
CPC ... H04W 84/06; H04W 84/005; H04W 88/16; H04W 24/02; H04B 7/18554; B64C 2201/122
See application file for complete search history.

(56) References Cited

U.S. PATENT DOCUMENTS

| | | | | |
|---|---|---|---|---|
| 6,393,294 | B1* | 5/2002 | Perez-Breva | G01S 5/0252 |
| | | | | 342/451 |
| 9,906,317 | B2* | 2/2018 | Tipton | H04B 17/26 |
| 2007/0026870 | A1* | 2/2007 | Spain | G01S 5/0252 |
| | | | | 455/456.1 |
| 2010/0227626 | A1* | 9/2010 | Dressler | G01S 5/0252 |
| | | | | 455/456.1 |
| 2011/0063098 | A1* | 3/2011 | Fischer | G07C 9/00119 |
| | | | | 340/439 |

(Continued)

*Primary Examiner* — Khai M Nguyen
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things). For example, systems and method for vehicular positioning based on wireless fingerprinting data in a network of moving things including, for example, autonomous vehicles.

21 Claims, 19 Drawing Sheets

(56) References Cited

U.S. PATENT DOCUMENTS

2015/0264554 A1\* 9/2015 Addepalli ............ H04W 4/046
                                              370/328
2017/0219681 A1\* 8/2017 Ghinamo .............. G01S 5/0252
2018/0279251 A1\* 9/2018 Wigren ................ H04W 24/10

\* cited by examiner

SYSTEMS AND METHODS FOR VEHICULAR POSITIONING BASED ON WIRELESS FINGERPRINTING DATA IN A NETWORK OF MOVING THINGS INCLUDING, FOR EXAMPLE, AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/360,592, filed on Jul. 11, 2016, and titled "Systems and Methods for Vehicular Positioning Based On Wireless Fingerprinting Data in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
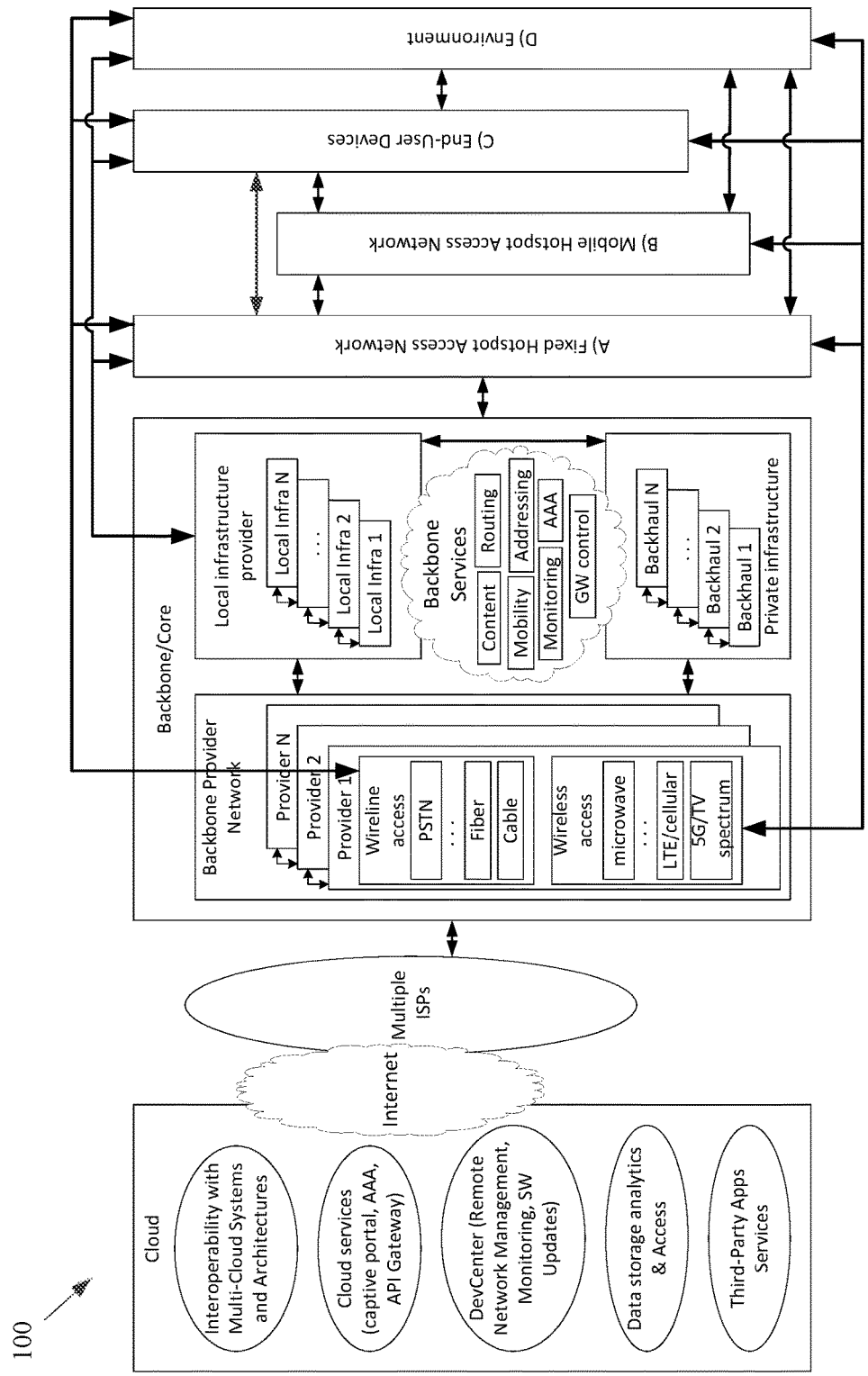
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising,"

"including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
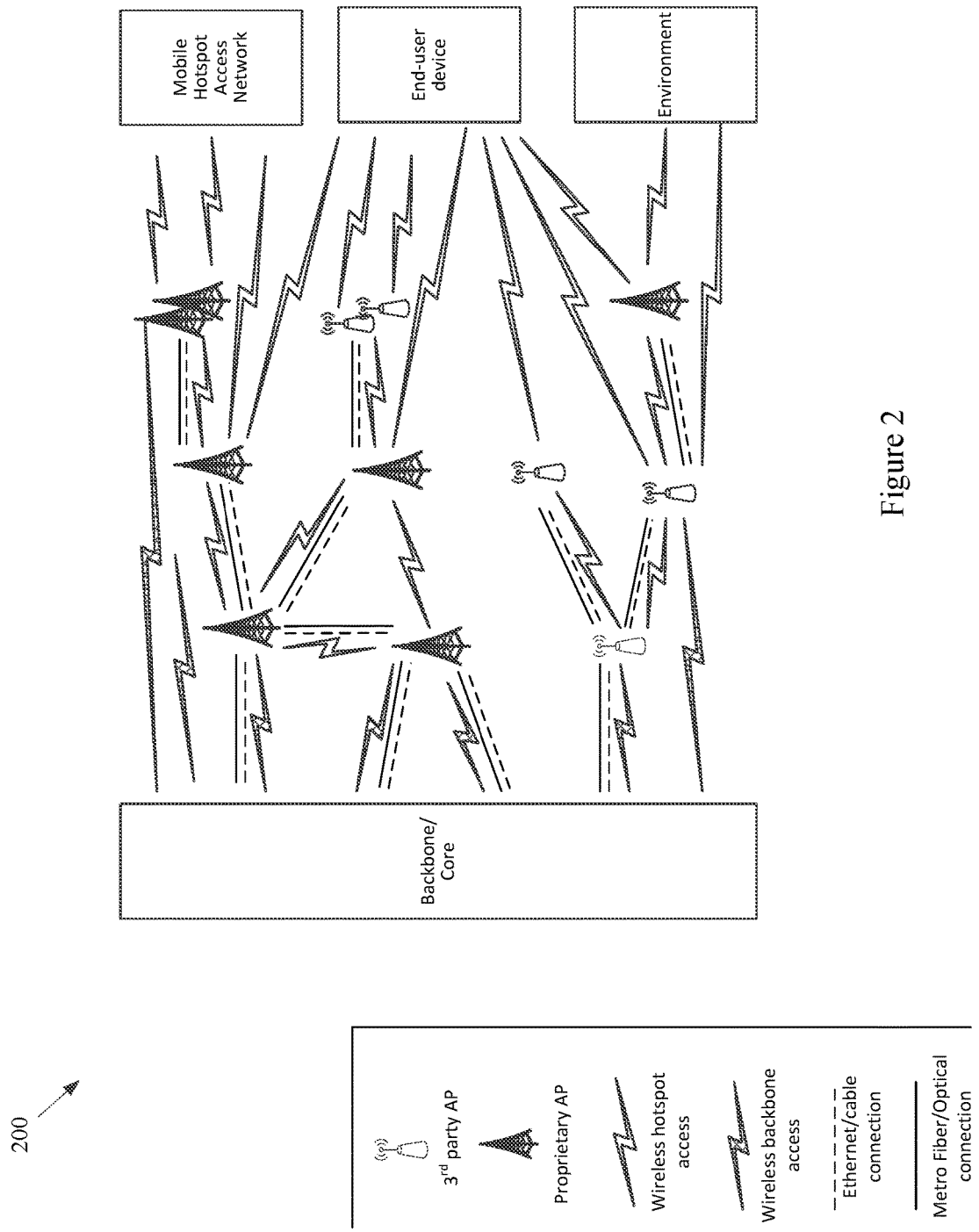
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
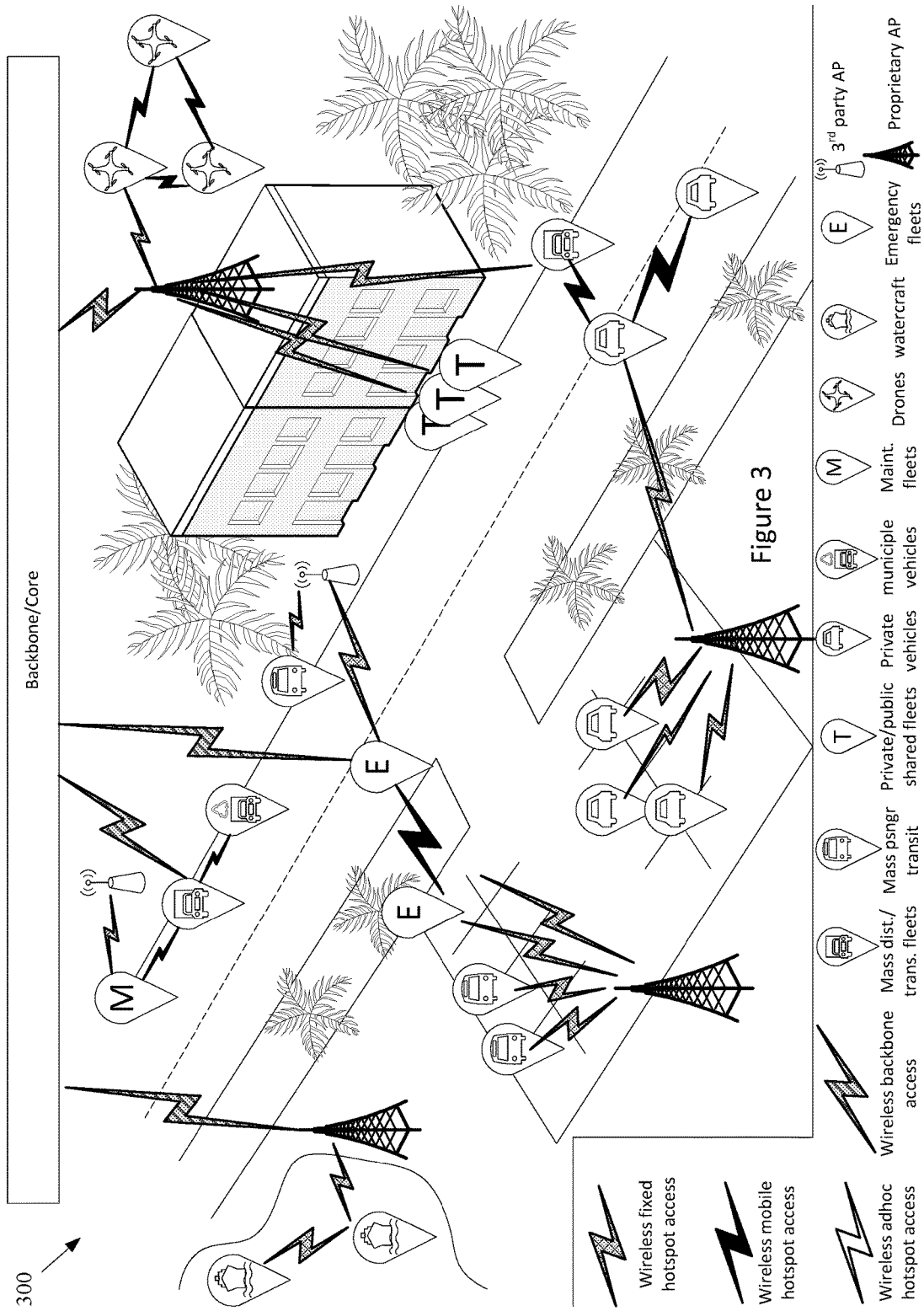
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
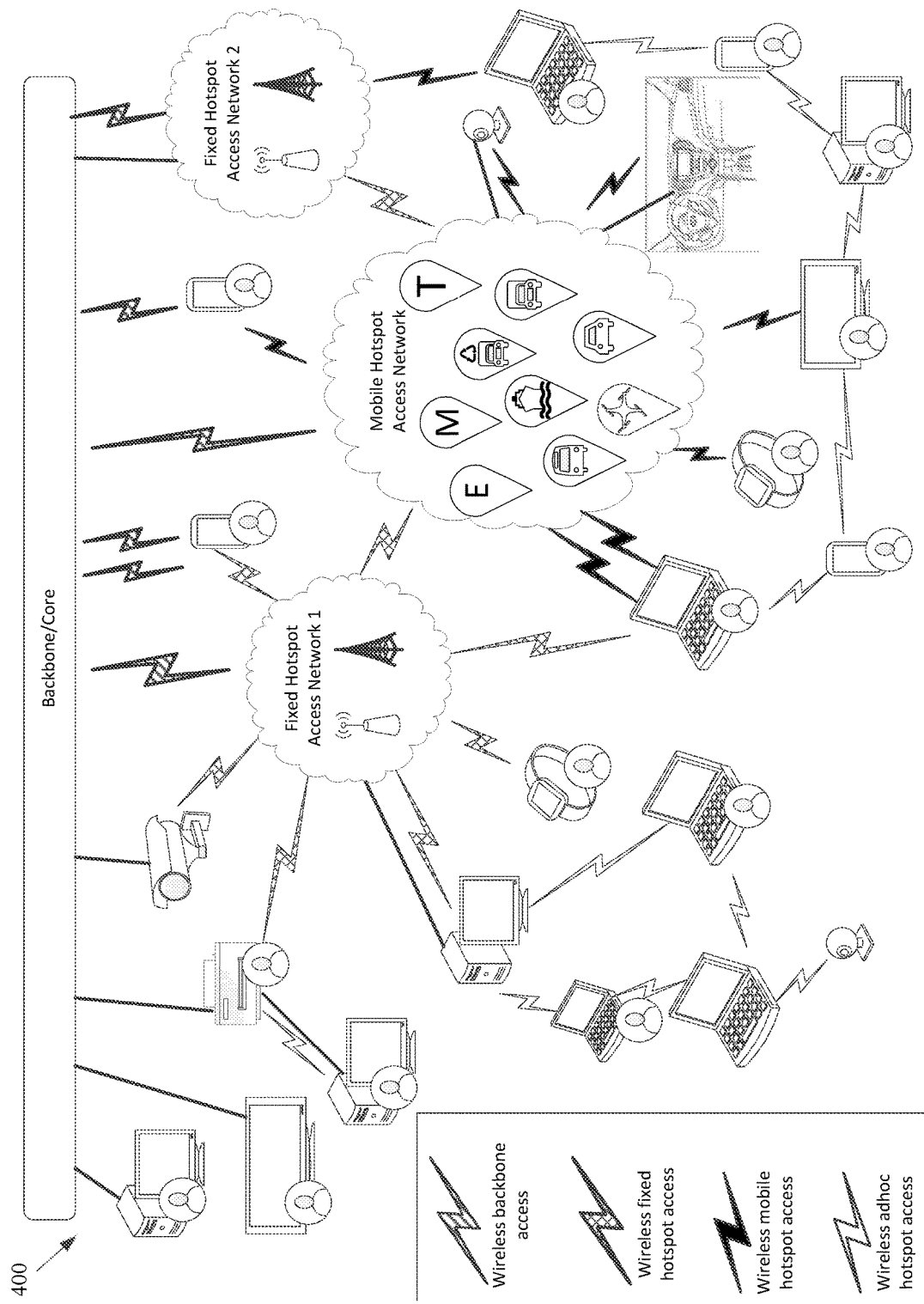
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
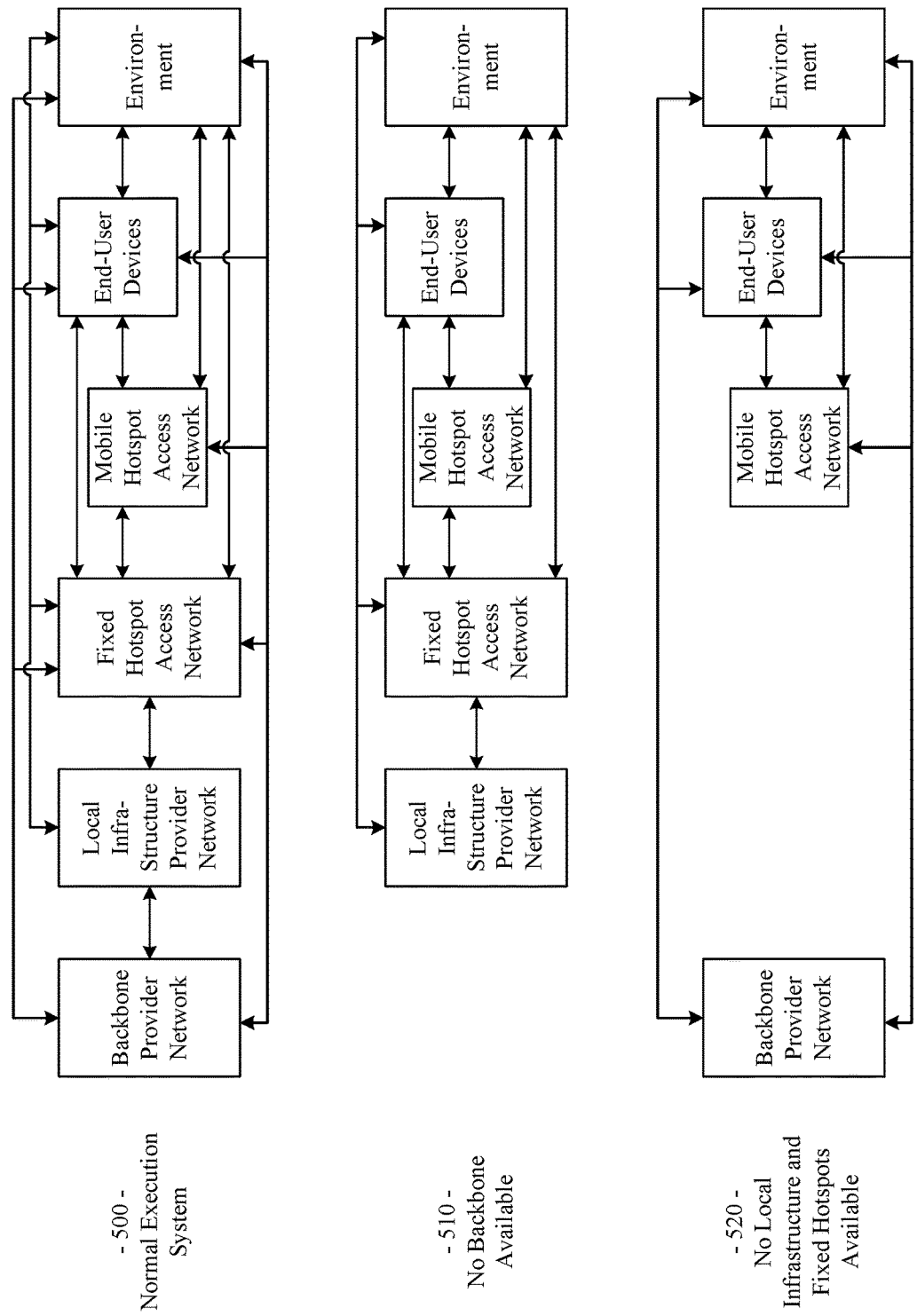
FIGS. 5A-5C show a plurality of network configurations illustrating the flexibility and/or and resiliency of a communication network, in accordance with various aspects of this disclosure.
Figure 5B:
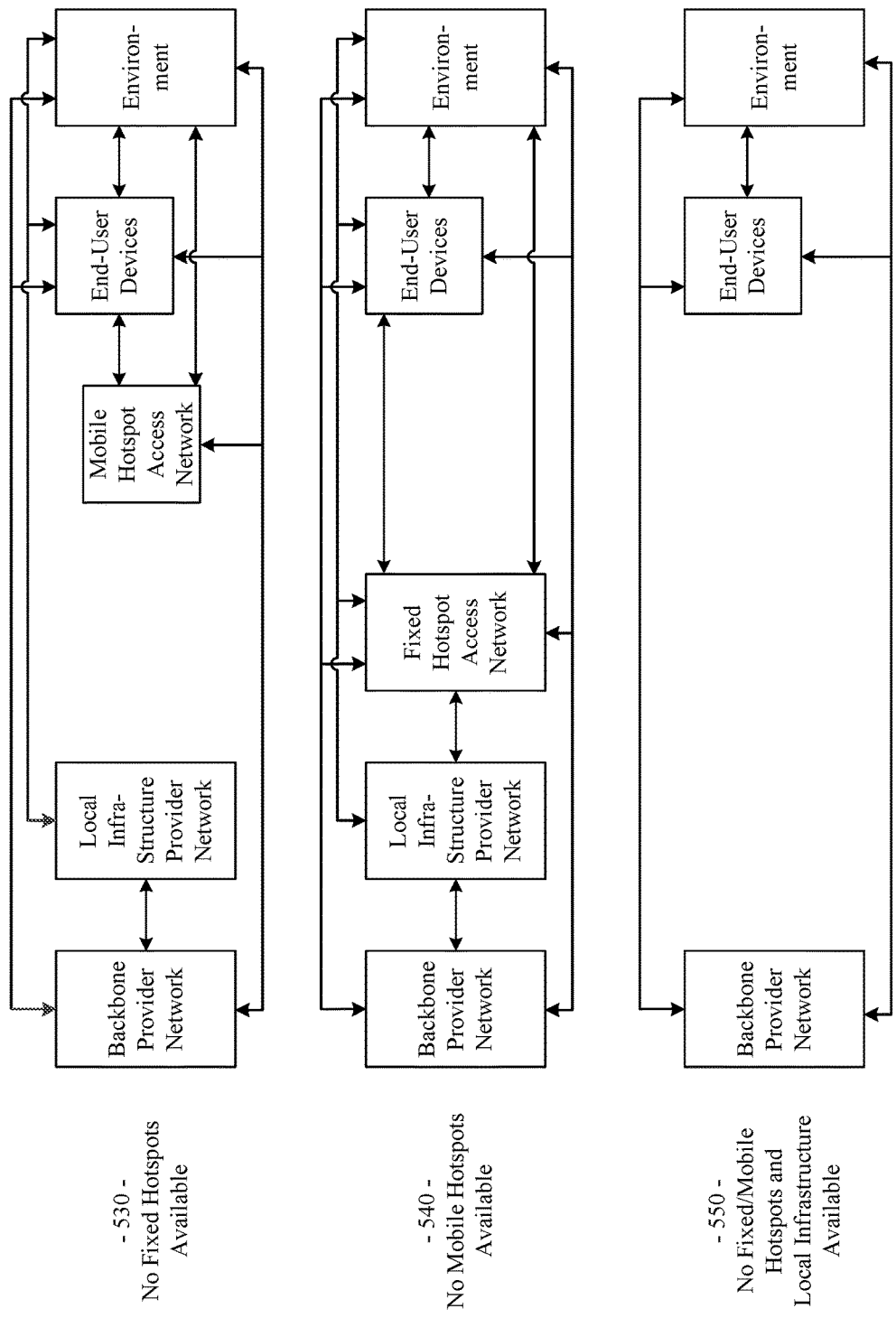
Figure 5C:
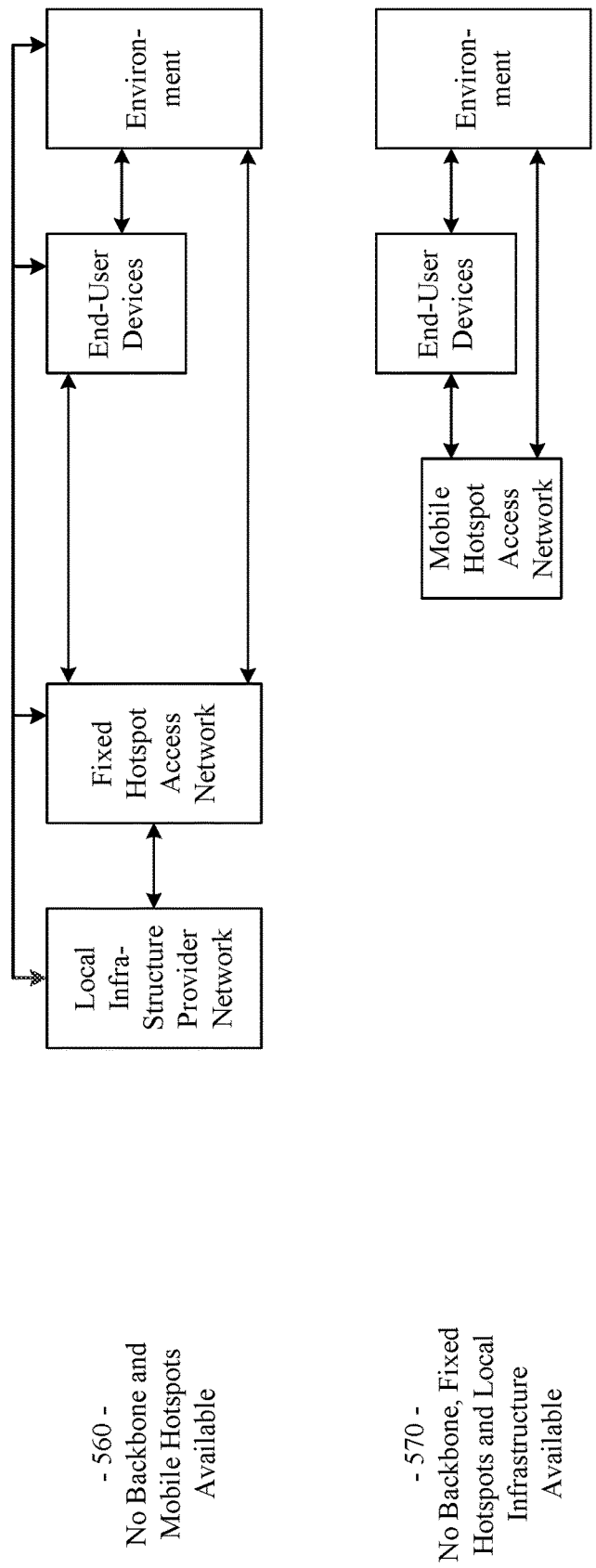

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
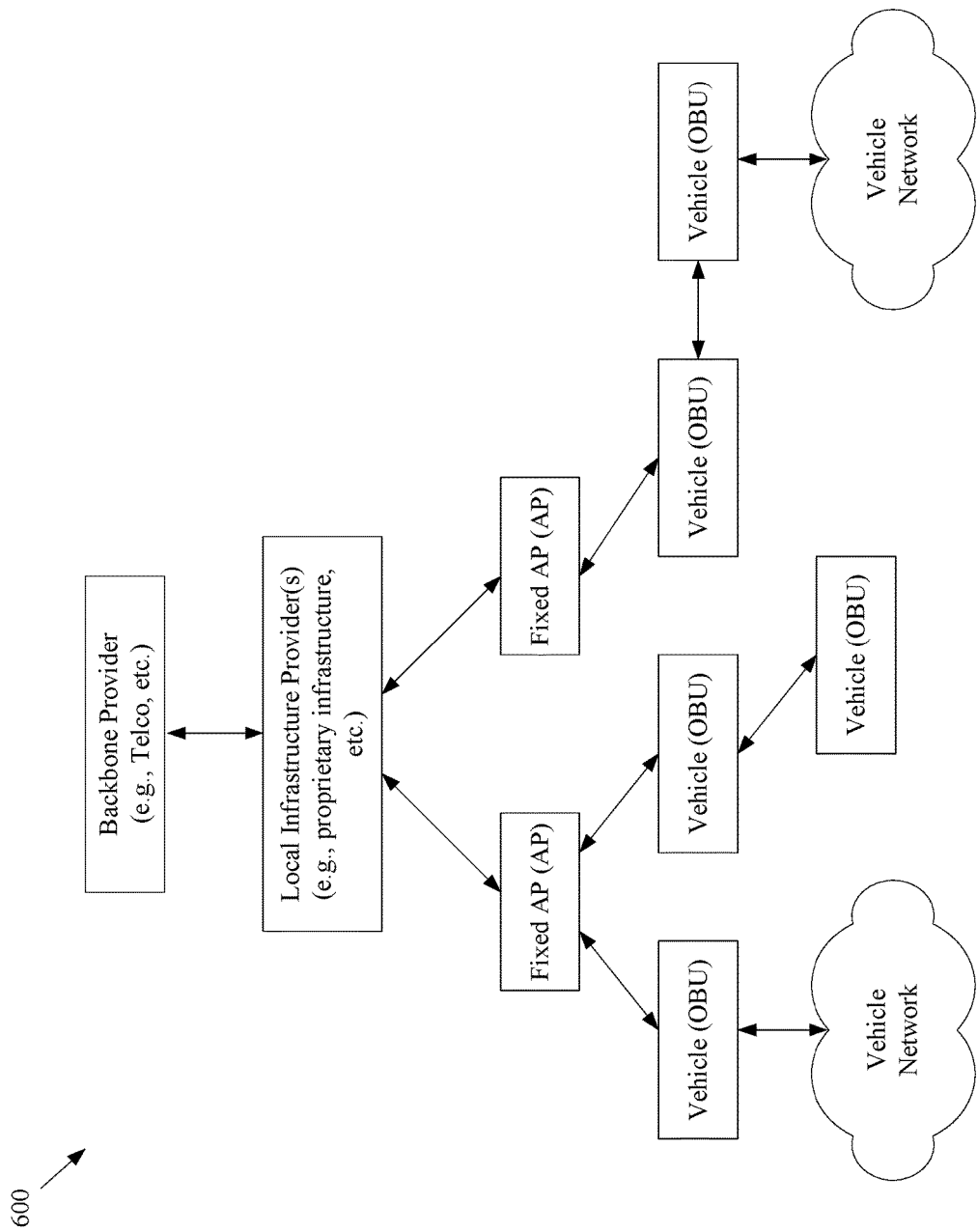
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
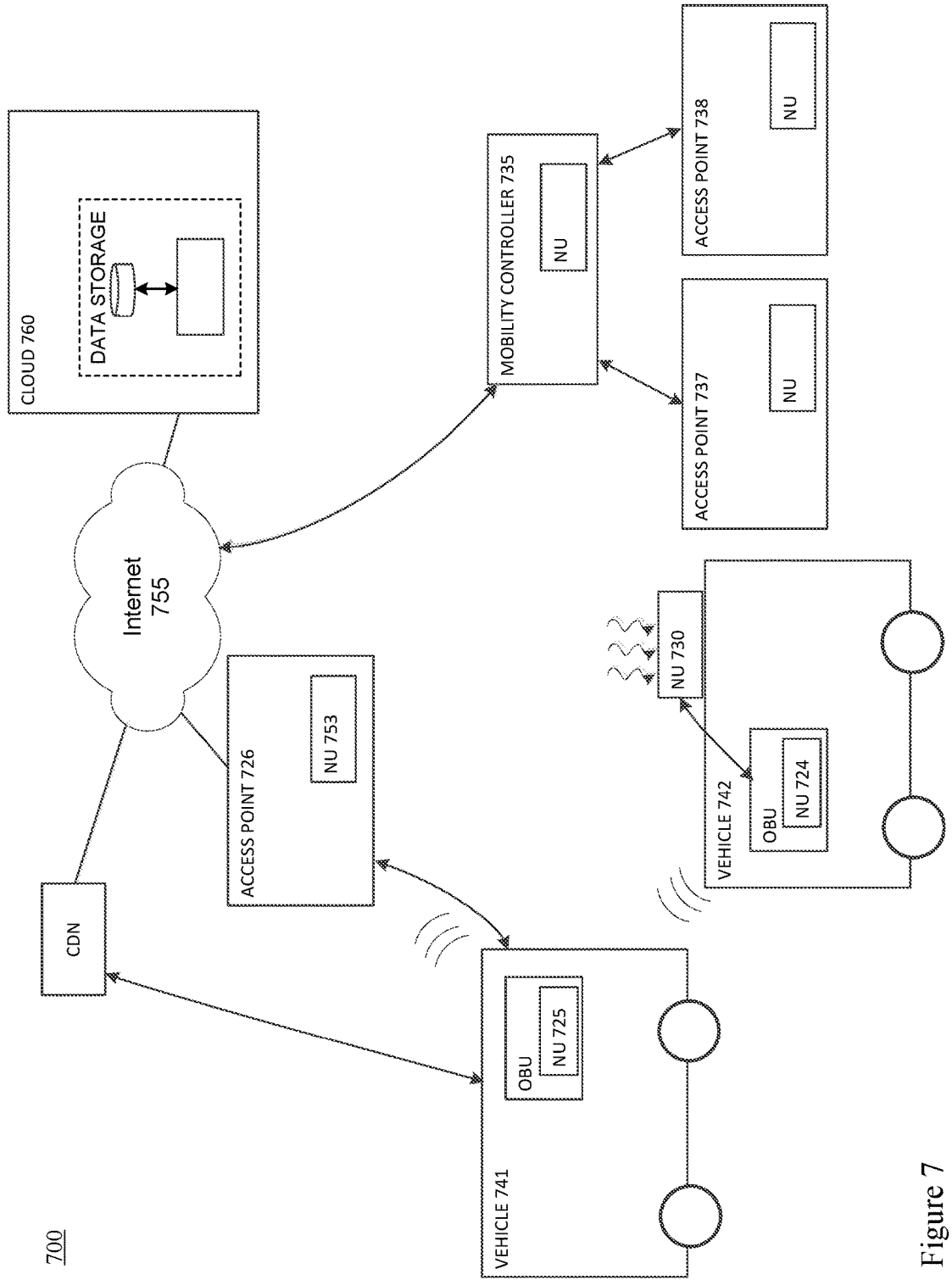
FIG. 7 shows a block diagram of an example communication network, in accordance with various aspects of the present disclosure.

FIG. 7 shows a block diagram of an example communication network 700, in accordance with various aspects of the present disclosure. The example network 700 may, for example, share any or all characteristics with the other example methods, networks, and/or network components 100-600, 800, and 1900 discussed herein. As illustrated in FIG. 7, the network 700 includes a number of network components (e.g., cloud 760; vehicles 741, 742; access points 726, 737, 738; and mobility controller 735). The vehicles 741, 742; access points 726, 737, 738; and mobility controller 735 each contain what may be referred to herein as a "network unit" (NU), represented in FIG. 7 as having respective NUs. In the context of a vehicle, the NU may be part of, for example, an OBU, a mobile AP, and an MC/NC, as previously described above. The vehicles 741, 742 may be any of a variety of types of vehicles including, by way of example and not limitation, an automobile, truck, taxi, van, bus, train, autonomous vehicle (AV), or the like.

In accordance with various aspects of the present disclosure, the mobile NUs may have a number of communication interfaces for various wired and wireless communication technologies and protocols, and may have access to a number of communication methodologies including, for example, a "DIRECT" communication methodology that involves direct communication with the destination entity, an "OPPORTUNISTIC" communication methodology that communicates with the destination entity only when one specific communication technology is available.), and an "EPIDEMIC" communication methodology that may deliver the message to the next available networking neighbor of the entity sending a message. The networking neighbor that sent the message is then responsible for continuing the delivery of the message to its own neighbor node(s), thereby transporting the message through various network entities until the final destination is reached. Examples of communication technologies include, by way of example and not limitation, a direct short-range communication technology (DSRC) such as, for example, IEEE 802.11p and a Wi-Fi communication technology (e.g., IEEE 802.11a/b/g/n/ac/ad/af), that may be used to provide connectivity to a specific access-point; a Bluetooth® wireless communication technology that may be used to provide very short range (e.g., personal network range) connectivity; and a cellular communication technology that may be used for longer range connectivity (e.g., 3G, 4G, 5G, Long Term Evolution (LTE), Global System for Mobile communication (GSM), code division multiple access (CDMA), time division multiple access (TDMA); etc. In accordance with various aspects of the present disclosure, NUs that are "fixed" rather than "mobile" may, for example, be configured to rely on "DIRECT" communication methodologies. Additional details of communication methodologies may be found, for example, in U.S. Provisional Patent Application No. 62/272,750, entitled "Systems and Methods for Remote Software Update and Distribution in a Network of Moving Things,", filed Dec. 30, 2015; and U.S. Provisional Patent Application No. 62/278,662, entitled "Systems and Methods for Remote Configuration Update and Distribution in a Network of Moving Things,", filed Jan. 14, 2016, the complete subject matter of each of which is hereby incorporated herein by reference, in its respective entirety.

A network of moving things in accordance with various aspects of the present disclosure is able to communicate data with both mobile and fixed NUs. For example, the mobile NUs 724, 725 in their respective vehicles 742, 741 of FIG. 7 may not have continuous access to or communication with the data storage of cloud 760. In accordance with various aspects of the present disclosure, such mobile NUs may leverage any existing communication connections that are available such as, for example, cellular, Wi-Fi, DSRC, or other suitable communication technology. In accordance with various aspects of the present disclosure, mobile NUs such as, for example, the NUs 725, 724 of their respective vehicles 741, 742 of FIG. 7 may, for example, communicate with fixed NUs such as, for example, the NUs 753, 737, 738 of FIG. 7, using the EPIDEMIC communication methodology, described above.

In accordance with various aspects of the present disclosure, various sensors (e.g., sensors connected to NU 730) may not have direct access to or be in communication with the data storage of the cloud 760, and therefore may leverage the connectivity provided by an NU such as, for example, the "relay" NU 724 of vehicle 742, to which they may connect. Such relay NUs (RNUs) may communicate with any such sensors, in order to enable any such sensors to communicate sensor data with, for example, the cloud 760.

The ever growing volume of information generated by the huge variety of connected devices raises constant challenges in providing reliable transport for that data. Within a few years, with the continued proliferation of the Internet of Things and further deployment of smart sensors, the transportation of the growing volume of data generated by such devices will present a tremendous challenge not only in terms of the amount of bandwidth required, but also with regard to connectivity costs.

A network in accordance with various aspects of the present disclosure, which may be referred to herein as the "Internet of Moving Things" (IoMT), provides a platform that is highly optimized for the transport of data generated by, for example, various sensors in the area served by such a network, in a very scalable way. Additional details regarding interfacing among sensors and a network in accordance with various aspects of the present disclosure may be found, for example, in U.S. Provisional Patent Application No. 62/222,135, entitled "Systems and Methods for Collecting Sensor Data in a Network of Moving Things,", filed Sep. 22, 2015. Additional details regarding adapting the granularity, bandwidth, and priority of sensing and disseminating data may be found, for example, in U.S. Provisional Patent Application No. 62/253,249, entitled "Systems and Methods for Optimizing Data Gathering in a Network of Moving Things,", filed Nov. 10, 2015. The complete subject matter of each of the above-identified provisional patent applications is hereby incorporated herein by reference, in its respective entirety.

All of the data collected by elements in a network of moving things is potentially valuable for a wide variety of applications and insights, most of which are yet to be discovered. End-to-end data integrity is important in any network, and is particularly so in a network such as the IoMT of the present disclosure, considering the variety of elements and processes involved in its acquisition. At the present time, just a small fraction of the data collected from connected devices is actually being used. However, network support for the collection of high definition data is of increasing importance. A network in accordance with various aspects of the present disclosure provides the foundations for an analytics system that uses collected sensor and other data to provide, for example, optimizations and predictions in a wide variety of different areas (e.g., transportation, environment, and/or communication).

The mobile and dynamic network infrastructure that provides support for a network of moving things such as that described herein may provide an interface for a number of clients/customers/users such as, for example, third-parties that wish to test their own applications, vehicle fleet operators that desire to deploy their own fully-managed services to control and manage their fleets, and telecommunication network (telco) operators that want to expand their infrastructure (e.g., fiber infrastructure, cellular infrastructure, etc.). Because a network of moving things according to various aspects of the present disclosure may be used by a wide variety of different entities and applied for numerous applications and purposes, the operation of such a network may use policies to, for example, control access to the network by each of the clients, and manage the use of the applications that are employed to monitor, diagnose, and survey the status of the network elements and of the network environment. Such software applications that monitor and survey the network include, by way of example and not limitation, software applications that monitor the status of the critical hardware modules and system software applications to enable corrective action can to be taken when abnormal behavior is detected, software applications that monitor network behavior to understand and evaluate how the network is working and to diagnose possible problems, and software applications that perform surveys/studies in the network to gather information from the network to help in deploying and configuring the network in an optimal way.

Execution of such software applications by various network elements may involve access to shared data available in the system (e.g., information about neighboring network elements, information about central processing unit (CPU) load, information characterizing/identifying available sensing, communication, storage, or other technologies of a network element), access to particular sources of information (e.g., Global Navigation Satellite System (GNSS)/ Global Positioning System (GPS) receivers, vehicle on-board diagnostic (OBD/OBD2) information, etc.). Execution of such software applications by network elements may also involve the use of certain levels of resources (e.g., a minimum/desired amount of bandwidth used/needed to send data to, for example, the Cloud; the amount of memory/storage needed (e.g., disk space, flash memory, random access read/write memory, etc.), and each software application may be assigned a priority that may be used to determine whether the software application should run, or not run, when other software applications that have their own assigned priorities are also present on a network element. Each software application may have a different mode of operation (e.g., may use a particular level of resources (e.g., a certain amount of data storage), or may have a certain length sampling period), and in accordance with aspect of the present disclosure may be dynamically configured and adapted on-demand. In addition, such software applications may receive inputs/data from a client/customer/user system external to the network described herein (e.g., using an application programming interface (API) accessible, for example, locally or from the Cloud) that may, for example, affect the modes of monitoring/surveying performed by the software application. A network of moving things in accordance with aspects of the present disclosure may decide whether such received inputs/data will be applied or enforced in the network, because more than one external source or entity may provide such inputs/data.

A network of moving things in accordance with various aspects of the present disclosure enables the smooth and harmonized coexistence of a variety of software applications that perform monitoring in a highly dynamic and moving environment based on, for example, the context information of the system itself (e.g., including wireless network context information) and also the context of the vehicle(s) on which network elements are located. A network system in accordance with aspects of the present disclosure automatically adapts, for example, the assigned priority, the levels of assigned physical interfaces (PHY)/communication resources, the periods of time that the software application is active and inactive (e.g., turn-on/turn-off), the modes of operation of the software application, and the status of each monitoring application on a network element/node. Such a system may adapt the granularity, sampling period, type of data, and the resources used by different monitoring applications, and may prioritize software applications that perform monitoring and surveying, one over another, as well as with respect to the client's services and software applications running on a network element (e.g., applications that provide Internet access, that perform data acquisition, etc.) such as, for example, a mobile AP, fixed AP, or MC/NC. In this manner, a network of moving things in accordance with various aspects of the present disclosure may provide improved handling of the volatility of the resources and high mobility of nodes of the network.

The precision of positioning systems based on space-based references (e.g., receivers that employ radio frequency signals from Global Navigation Satellite System (GNSS)/ Global Positioning System (GPS) satellites) strongly rely on having a clear, "line-of-sight" view of satellites in the sky view of the GNSS/GPS receiver. Thus, in typical urban environments, tall buildings, narrow streets, and the remaining city landscape degrade GNSS/GPS signal reception and, consequently, the precision of the geographic position provided by the GNSS/GPS receiver. Without a clear view of a sufficiently large portion of the sky, a receiver for a GNSS does not work, as is the case of tunnels and overpasses. Moreover, bad weather conditions may also affect the GNSS signal and degrade the precision of a position derived from such signals. Traditional GNSS devices, due to the conditions mentioned above, may have a very poor Time-To-First-Fix (TTFF), the measure of the time required for a GNSS receiver to acquire satellite signals and navigation data, and calculate a position solution (i.e., a "fix"). The speed of the process of acquiring the satellite signal and navigation data depends upon the knowledge of satellite signal timing of the receivers, which depends, in part, upon the location of the receiver and the satellites currently in view of the receiver. A system in accordance with various aspects of the present disclosure may use radio frequency signals from terrestrial sources, referred to herein as "radio frequency (RF) wireless fingerprinting," to immediately determine a position with a precision that depends on the quality of the RF fingerprinting or "RF signature." Urban environments are frequently dominated by a considerable density of wireless radio frequency networks, whether they are public, private, commercial, governmental, or residential. The RF wireless fingerprint of such a wireless network environment may be leveraged to provide added value data for commercial purposes or, as described herein, to create unique RF signatures of various geographic locations.

The positioning system described herein may be used to enhance "dead reckoning" based positioning systems that use estimates of, e.g., distance, direction, and/or time traveled to determine current position, e.g. inertial navigation, by using reliable and unique RF fingerprints or signatures to re-calibrate such positioning systems. A positioning system in accordance with various aspects of the present disclosure may leverage a vehicular network platform that supports a "network of moving things," such as that described in U.S. patent application Ser. No. 15/133,756, entitled "Communication Network of Moving Things," filed Apr. 20, 2016, the complete subject matter of which is hereby incorporated herein, by reference in its entirety. Such a platform may be based upon a number of available wireless communication technologies (e.g. IEEE 802.11p/a/b/g/n/ac/ad/af, cellular, etc.) and may include access points that, beyond connectivity, provide wireless RF signatures in locations where use of a GNSS system for positioning information may be very inefficient, or impossible. The amount of data involved in training a positioning system such as that described herein is considerable, and the platform of an Internet of Moving Things according to various aspects of the present disclosure is ideal for the periodic collection of RF fingerprinting or signature information in a cost-effective manner.

A positioning system in accordance with various aspects of the present disclosure may leverage wireless fingerprinting or signature information produced by a framework of what may be referred to herein as an Internet of moving things framework. Such a positioning system provides fast positioning (i.e., "fix") information for vehicles in situations where other positioning systems are unavailable, unusable, or lack precision. A system in accordance with various aspects of the present disclosure also provides a flexible and configurable scheme to detect when to acquire additional wireless fingerprinting data, and/or when to correlate such data with additional sources of information to improve the accuracy of positioning of vehicles.

The position information determined by such a system may be used along with other positioning systems to improve an overall positioning solution. Additional information about other positioning systems supported by the framework of a network of moving things may be found in U.S. Provisional Patent Application No. 62/336,891, entitled "Systems and Methods For Vehicular Positioning Based On The Round-Trip Time Of DSRC Messages In A Network Of Moving Things," filed May 16, 2016, the complete subject matter is which is hereby incorporated herein by reference, in its entirety. A positioning system in accordance with various aspects of the present disclosure may include an API for positioning using wireless information from mobile devices.

A positioning system using wireless fingerprinting according to various aspects of the present disclosure may operate according to two phases of activity. The first phase may be referred to herein as a "training phase" during which training data is acquired, filtered, analyzed, and indexed to form a collection of wireless fingerprint sample data, which may be stored in what may be referred to herein as a "search server." The second phase may be referred to herein as an "online phase" during which one or more network elements (e.g., nodes, network units, mobile APs), which may be mobile and may be located in one or more vehicles, may each take what may be referred to herein as a "wireless snapshot" of their respective wireless environments (i.e., a current "wireless fingerprint sample" taken by a network element for the purpose of requesting a location estimate) and may each request a cloud-based system (e.g., the "search server") to perform a search for the respective positions of each vehicle using the respective "wireless snapshot." This "wireless snapshot"/wireless fingerprinting sample may include, for example, information identifying a set of terrestrial wireless signal sources such as access points (e.g., mobile and/or fixed APs) within their reach/range of reception and the respective radio frequency and signal strength (e.g., RSSI) of each such signal source. An example wireless finger print sample is shown in and discussed below with regard to FIGS. 14A-14B. In accordance with various aspects of the present disclosure, signals from additional terrestrial wireless (e.g., radio frequency) signal sources may also be evaluated by, for example, a mobile AP including, by way of example and not limitation, commercial radio frequency signal sources such as commercial business communication and broadcast radio and television systems, cellular base stations, and both public and private radio frequency signal sources such as, e.g., residential, business, and public Wi-Fi "Hotspots." The system(s) of vehicles carrying mobile APs and/or a network unit/on-board unit (OBU)/mobile AP may provide location information, identifier(s) of visible satellite(s) and satellite signal strength(s), and other parameters (e.g., quality indications such as dilution of precision information) from an onboard GNSS/GPS receiver. It should be noted that certain infrastructure elements of a network according to the present disclosure such as, for example, fixed APs, may know their own geographic locations (e.g., latitude and longitude) very accurately (e.g., to within three inches, to within a foot, to within a yard, to within ten feet) and may wirelessly broadcast such location information along with other parameters (e.g., type of access point, a unique access point identifier) to receivers within wireless communication range on a regular, intermittent, or periodic basis. Further, some network elements such as network units (NUs) and mobile APs may know their own geographic locations because they may have clear views to satellites of a GNSS constellation or have determined their own geographic locations using other techniques, and may wirelessly broadcast/share their respective geographic locations and identity to other network elements (e.g., to NUs, fixed APs, mobile APs, etc.) Additional information about how a mobile network element (e.g., mobile AP) may determine its own geographic location using elements of a wireless network as described herein may be found, for example, in U.S. patent application Ser. No. 15/596,380, titled "Systems and Methods for Vehicular Positioning Based on the Round-Trip Time of DSRC," filed May 16, 2017, the complete subject matter of which is hereby incorporated herein, by reference, in its entirety. The signals transmitted/shared by such infrastructure elements may be received by other network elements (e.g., mobile APs) that are operating in the training and/or online phases discussed herein, and those network elements may use that location information and parameters transmitted by the infrastructure elements as described herein.

Figure 8:
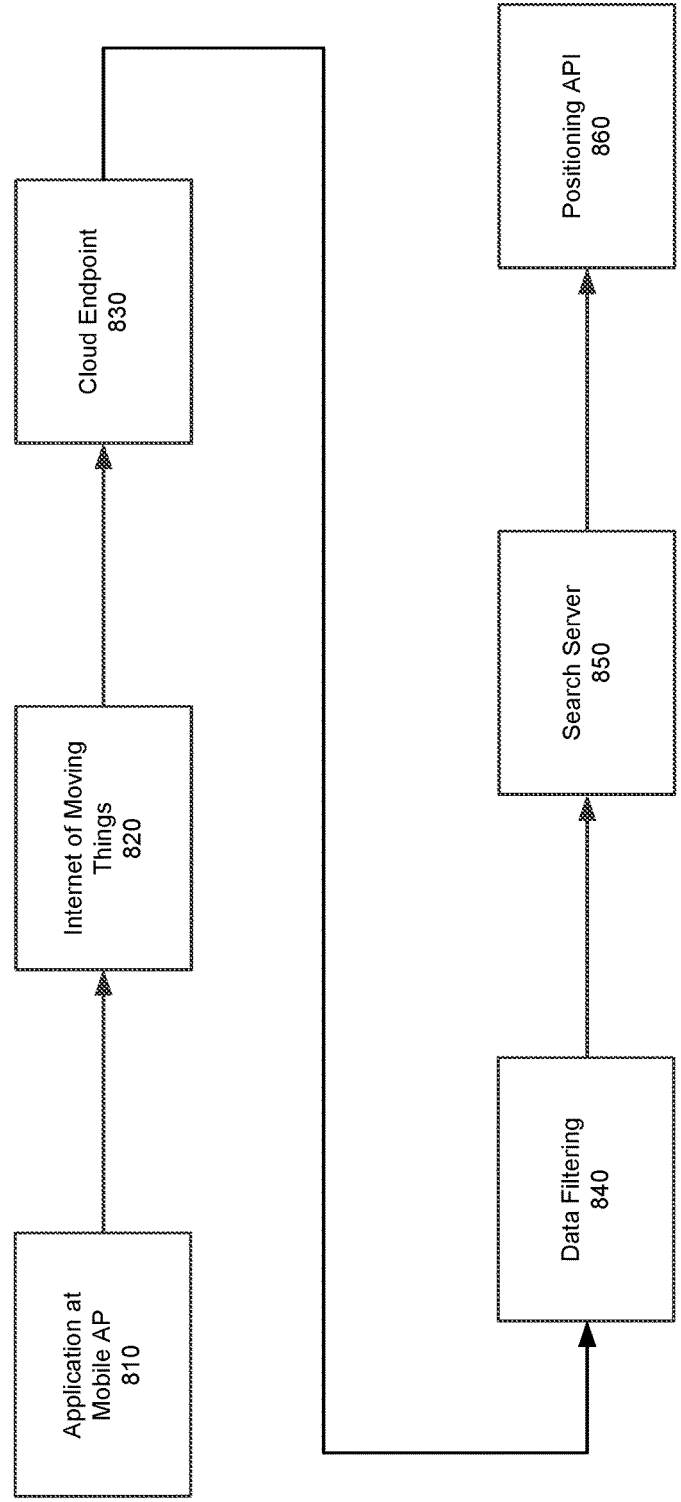
FIG. 8 is a block diagram illustrating the flow of data used for wireless fingerprinting, in accordance with various aspects of the present disclosure.

FIG. 8 is a block diagram illustrating the flow of data used for wireless fingerprinting, in accordance with various aspects of the present disclosure. The integration of a number of different components/mechanisms are involved in a system according to various aspects of the present disclosure, as shown in FIG. 8, which shows acquisition of data representative of signals of the wireless environment by a mobile AP (MAP) 810, communication of the acquired data via a network referred to herein as the Internet of Moving Things (IoMT) 820 and a Cloud Endpoint 830, Data Filtering functionality 840, Search Server functionality 850, and a Positioning Application Program Interface (API) 860.

Acquisition of data used in training a wireless fingerprinting system in accordance with various aspects of the present disclosure may be performed by software running at one or more mobile APs (e.g., MAP 810) of the IoMT, which may correspond to, for example, the access points 737, 738 and the OBUs of the vehicles 741, 742 of FIG. 7, for example. In accordance with various aspects of the present disclosure, the software of those network elements may periodically trigger a scan of the wireless radio frequency (RF) environment by each of the wireless communications interfaces of each MAP. In accordance with various aspects of the present disclosure, the portion(s) of RF spectrum scanned and the time interval between such scans may, for example, by influenced by a decay in the performance of the positioning system of the MAP 810 over time. When the MAPs of the IoMT first begin operation, the scanning of the wireless RF environment of the MAP may be as frequent as possible, to gather as much RF environment data as possible, to aid in providing what may be referred to as "training data" to the wireless fingerprinting mechanism according to aspects of the present disclosure. Geographic regions of particular interest and geographic regions not of interest may be defined, so that wireless scanning activity may be performed with the greatest detail and accuracy in geographic areas where the wireless fingerprinting mechanism has detected a lack of such training data. The wireless fingerprint sample data and associated parameters representing the RF environment gathered by each of the MAPs may be stored by the MAPs as it is acquired, and in accordance with some aspects of the present disclosure, such information may then be opportunistically sent to storage in the Cloud (e.g., Cloud 760 of FIG. 7) using an IoMT framework. Additional information regarding the operation of a suitable IoMT framework, including the IoMT 820 and the Cloud Endpoint 830 of a network according to aspects of the present disclosure may be found, for example, in U.S. Provisional Patent Application No. 62/257,421, entitled "Systems and Methods for Delay Tolerant Networking in a Network of Moving Things," filed Nov. 19, 2015, the complete subject matter of which is hereby incorporated herein by reference, in its entirety.

In accordance with various aspects of the present disclosure, the information representing the RF environment that is gathered by each of the MAPs is then sent for processing. As shown in FIG. 8, processing of the acquired data may include, for example, filtering the received samples representing the RF environment using Data Filtering functionality 840 which, among other things, may detect outliers (e.g., RF environment samples that are statistically unlikely to occur or that are clearly erroneous due to corruption of data samples) and incomplete information (e.g., RF environment samples that are missing parameters). After analysis of the incoming data from the MAPs, the information may then be indexed in a search server such as, for example, the Search Server functionality 850 of FIG. 8, which builds a collection of wireless snapshot/wireless fingerprint sample data as training data to be used by the wireless fingerprinting process. Some RF sources may have information available that is associated with the source that may not be available for other RF sources. A system in accordance with the present disclosure may, for example, augment RF environment samples with information from outside information sources (e.g., data from government databases of geographic locations of licensed sources). For example, in the United States of America, geographic location (geographic coordinates such as latitude/longitude), operating frequencies, type of modulation, and operator identity/use of many sources of commercial RF signals (e.g., broadcast TV and radio, cellular networks, government, and business band services) is available in government databases (e.g., the Federal Communication Commission (FCC)).

In accordance with various aspects of the present disclosure, positioning/location information may be accessed via a Positioning API 860. The Positioning API 860 may be used to access a geographic position calculated by an algorithm running at the Search Server 850 using the collection of training data acquired by the scanning process described above, based on additional input information sent by the vehicle housing the MAP. In accordance with various aspects of the present disclosure, the Positioning API 86—may be exposed on the Internet as a service available to customers/clients. In accordance with certain aspects of the present disclosure, the API may be directly accessible through the wireless network of the IoMT to the software (e.g., software applications, system software, etc.) of network elements (e.g., MAPs/FAPs/NCs) of the present disclosure.

Figure 9:
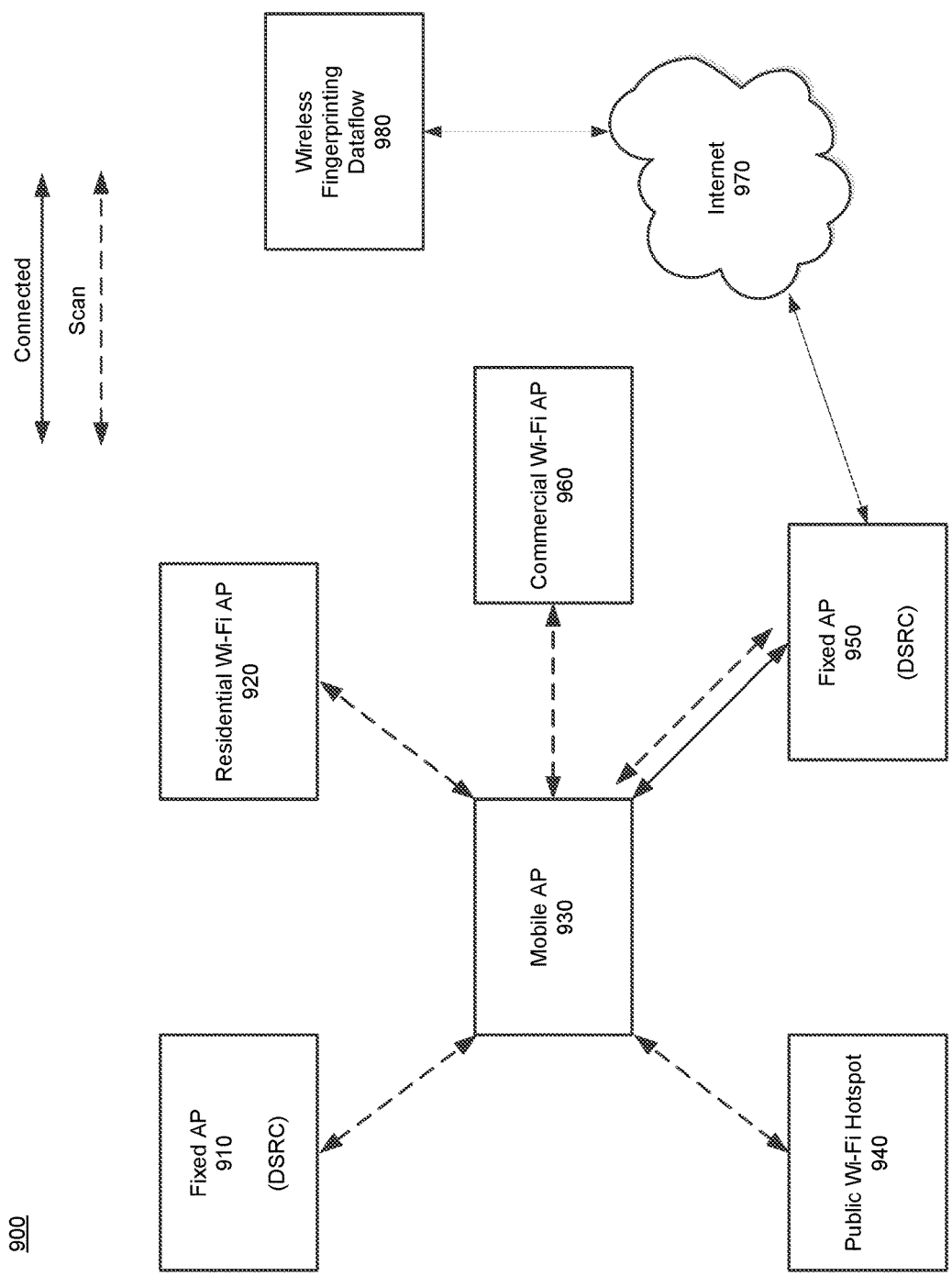
FIG. 9 is a block diagram illustrating an example information architecture of a wireless fingerprinting data acquisition mechanism during what may be referred to herein as a "training phase," in accordance with various aspects of the present disclosure.

FIG. 9 is a block diagram illustrating an example information architecture 900 of a wireless fingerprinting data acquisition mechanism during what may be referred to herein as a "training phase," in accordance with various aspects of the present disclosure. As shown in the illustration of FIG. 9, a mobile AP (MAP) 930 equipped with a variety of different wireless communication interfaces (e.g., cellular 3G, 4G, 5G, LTE, CDMA, TDMA, GSM, etc.), Wi-Fi (e.g., IEEE 802.11a/b/g/n/ac/ad/af, etc.), and DSRC (e.g., IEEE 802.11p) may perform periodic wireless (i.e., radio frequency (RF)) scans to identify any compatible RF signal sources (e.g., access points) in the vicinity of the MAP 930. Such scans may, for example, be triggered according to an amount of time since the last scan and/or according to an amount of distance traveled by the vehicle in which the MAP 930 is located, and the type of trigger may be based on configuration information received by the MAP 930 from one or more cloud-based systems (e.g., systems of Cloud 760). In the scenario shown in FIG. 9, the MAP 930 may identify two fixed APs (i.e., FAPs) equipped with DSRC (i.e., FAP 910 and FAP 950), and multiple Wi-Fi APs of different types (i.e., Residential Wi-Fi AP 920, Commercial Wi-Fi AP 960, and Public Wi-Fi AP 940). The example of FIG. 9 is typical of a particular example urban wireless landscape, noting that the number of APs in an actual urban environment may be much higher, offering a richer population of wireless fingerprint sample data sources at any given geographic location. It should also be noted that although cellular, Wi-Fi, and DSRC are given above as examples of RF wireless signals that may be scanned during the training phase described herein, those are only a few examples, as additional wireless signal sources may be used without departing from the spirit and scope of the present disclosure.

In accordance with various aspects of the present disclosure, a wireless fingerprinting application (e.g., a software application, and/or electronic circuitry and/or logic) running on the MAP 930 may, for example, store a radio frequency received signal strength indicator (RSSI) value, a Service Set Identifier (SSID), and a media access control (MAC) address (e.g., Basic Service Set Identifier, (BSSID)) for each Wi-Fi AP that is detected by the Wi-Fi communication interface of the MAP 930. Such Wi-Fi signal related information may, for example, be stored in association with a satellite-based or otherwise sourced geographic location at which the Wi-Fi signal and parameters were acquired by the MAP 930. The wireless fingerprinting application running on the MAP 930 may also, for example, store a value of a received signal strength indicator and a unique identification for each of the DSRC enabled FAPs 910, 950 of FIG. 9. In a similar manner, such DSRC-related information may, for example, be stored in association with a satellite-based or otherwise sourced geographic location at which the DSRC signal and parameters were acquired. For DSRC signal sources in accordance with aspects of the present disclosure, additional parameters including, for example, the geographic location broadcast by the DSRC signal source, may also be associated or linked with the DSRC-related information discussed above. It again should be noted that although the example and discussion of FIG. 9 addresses only access points/signal sources operating using DSRC and Wi-Fi wireless protocols, that does not represent a specific limitation of the present disclosure, as sources of additional and/or different wireless signals may be employed in a wireless fingerprinting approach according to the present disclosure. Further, additional and/or different metrics or parameters that help to differentiate or characterize the access points and/or wireless signal sources may also be employed including, for example, the form of authentication and/or encryption used by the signal source, the frequencies/ frequency band(s) in use by the signal source, information identifying the channel(s) in use, the type of AP/source, and/or the vendor of the AP/source. In addition, preferences of clients configured for operation through the MAP 930 may also be determined and recorded. A wireless fingerprinting application in accordance with various aspects of the present disclosure may also associate with wireless fingerprint sample data, a number of parameters including, by way of example and not limitation, location-related data such as, for example, the latitude, longitude, and/or altitude at which the wireless fingerprinting data sample(s) was/were acquired, as well as the speed and heading of the vehicle in which the acquiring MAP (e.g., MAP 930) is located, and GNSS time information provided by the GNSS (e.g., GPS) receiver of the MAP 930. The wireless fingerprint sample data may also be associated with parameters such as a timestamp identifying when the sample data was acquired, and a node ID or other identifier of the Mobile AP at which the wireless fingerprint sample data was acquired.

Once the data for each wireless fingerprinting sample of a wireless scan has been acquired and stored at the MAP, the wireless fingerprint sample data and associated parameters may then be sent to the Cloud (e.g., Cloud 870 of FIG. 7) using, for example, an opportunistic data communication mechanism such as the IoMT framework described and referenced herein. Additional details for a suitable data communication mechanism may be found, for example, in U.S. Patent Application No. 62/222,135, entitled "Systems and Methods for Collecting Sensor Data in a Network of Moving Things," filed on Sep. 22, 2015, the completed subject matter of which is hereby incorporated herein by reference, in its entirety. In the example shown in FIG. 9, the mobile AP 930 is represented as being communicatively coupled to the fixed AP 950, which is in turn communicatively coupled to the Internet 970. Using this path, the mobile AP 930 may transfer the wireless fingerprint sample data and associated parameters to the Wireless Fingerprinting Data Flow 980, which may correspond to, for example, the data flow further details of which are shown in and discussed above with regard to FIG. 8. The wireless fingerprint sample data and associated parameters are then processed at one or more systems in the Cloud (e.g., Cloud 870), in order to, in part, discard samples that have inappropriate or missing values or samples that are outliers (e.g., when compared with previously stored sample data). In accordance with various aspects of the present disclosure, a search server such as the "Search Server" 850 may then index the filtered data acquired during the "training phase" discussed above, so that during what may be referred to herein as an "online phase," the search server may rapidly look for matching wireless fingerprint information, and perform an aggregation of results and infer the most probable geographic location.

Figure 10:
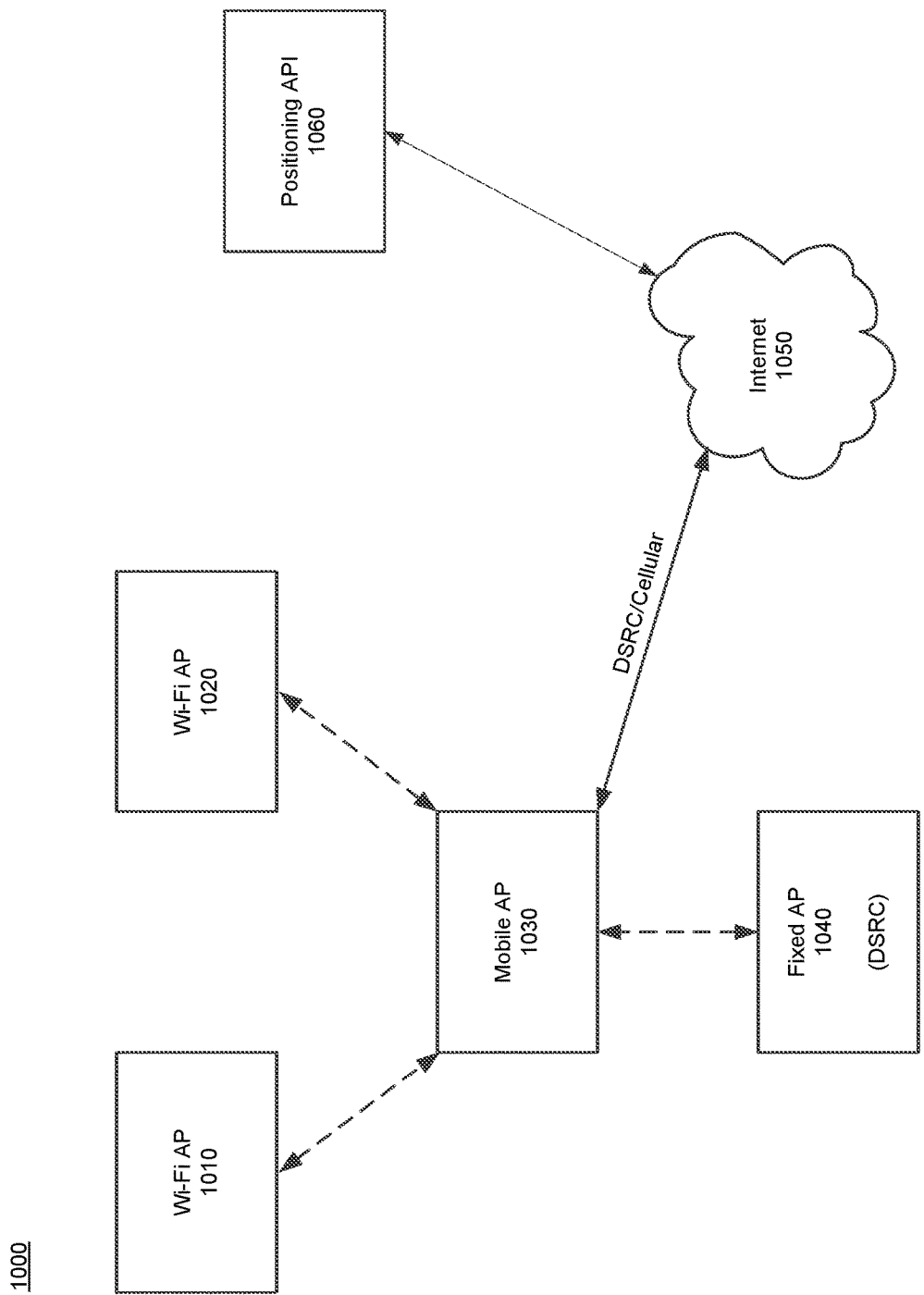
FIG. 10 is a block diagram illustrating an example information architecture of a wireless fingerprinting mechanism during what may be referred to herein as a "online phase," in accordance with various aspects of the present disclosure.

FIG. 10 is a block diagram 1000 illustrating an example information architecture of a wireless fingerprinting mechanism during what may be referred to herein as a "online phase," in accordance with various aspects of the present disclosure. As shown in example of FIG. 10, the "online phase" scenario includes a Mobile AP 1030 capable of detecting signals from two Wi-Fi APs 1010, 1020 and one Fixed AP 1040 equipped for DSRC communication. In order to determine its position, the Mobile AP 1030 may acquire and forward information identifying and characterizing the Wireless APs 1010, 1020, 1040 including, for example, the respective signal strengths of the Wireless APs 1010, 1020, 1040 as received by the Mobile AP 1030, to the Positioning API 1060 (e.g., that may be located at the Cloud 760 of FIG. 7) via a wireless DSRC or cellular communication link and the Internet 1050. If it is critical for the owner/operator of the Mobile AP 1030 to know the position of the MAP 1030 in real-time or near real-time, the information identifying and characterizing the Wireless APs 1010, 1020, 1040 and the respective signal strengths of the Wireless APs 1010, 1020, 1040 may be sent via, for example, a DSRC-capable fixed AP (if available), or via cellular connectivity (e.g., at typically a higher cost), through the Internet 1050, to the Positioning API 1060. If, however, the owner/operator of the Mobile AP 1030 does not require positioning information in real-time, the information identifying and characterizing the Wireless APs 1010, 1020, 1040 and the respective signal strengths of the Wireless APs 1010, 1020, 1040 may, for example, be sent opportunistically (as discussed above), and a tracking history may be processed at the Cloud in an "offline" manner.

When performing real-time location, a positioning API in accordance with various aspects of the present disclosure (e.g., the Positioning API 1060) may retrieve the most suitable geographic location based on the data provided by an API call to the Positioning API 1060. The algorithm performed at the back end of the positioning API to provide the positioning information may follow the following procedure. The procedure may first search the wireless fingerprint sample data and respective parameters acquired during the "training phase," to identify wireless fingerprint sample data for wireless APs matching the wireless APs currently detected by the Mobile AP (e.g., Mobile AP 1030). The procedure may then filter the identified wireless fingerprint sample data to collect samples whose received signal strength match the measured received signal strength indications to within a certain range or difference threshold. Next, the procedure may aggregate the collection of filtered wireless fingerprint sample data, and may then determine the centroid of the aggregation using the geographic location of each of the collected wireless fingerprint sample data. Although a number of parameters of radio frequency signals have been identified in this disclosure, there are many more parameters that are available that may help in producing a most accurate location from available signal sources captured during scanning of the wireless environment. The use of such parameters, although not specifically identified herein is within the scope of the present disclosure, In accordance with various aspects of the present disclosure, portions of the wireless fingerprint sample data acquired during the "training phase" ("training data") may be downloaded to one or more Mobile APs based upon, for example, the direction(s) of the vehicles carrying those MAPs, or a most probable path of travel, by taking historical path information for the respective MAP into account. Position determination using downloaded wireless fingerprint sample data may be referred to herein as operating in a "Local Mode." Such "Local Mode" positioning intelligence in a mobile AP may, for example, be employed to avoid the use of cellular connectivity as much as possible, including connectivity to systems (e.g., server(s)) located in the Cloud, and may enable operation when connectivity using wireless communication technologies such as, for example, DSRC (e.g., IEEE 802.11p), Wi-Fi (e.g., IEEE 802.11a/b/g/n/ac/ad/af), or cellular (e.g., 3G, 4G, 5G, LTE, CDMA, TDMA, GSM, UMTS) is intermittent or non-existent. Such MAP-resident data is even more useful when employed together with, for example, other sensors such as inertial sensors and/or vehicle sensors (e.g., vehicle navigation system, wheel rotation, and/or autonomous vehicle sensors), to provide reliable checkpoints and enable recalibration of such sensors.

Figure 11A:
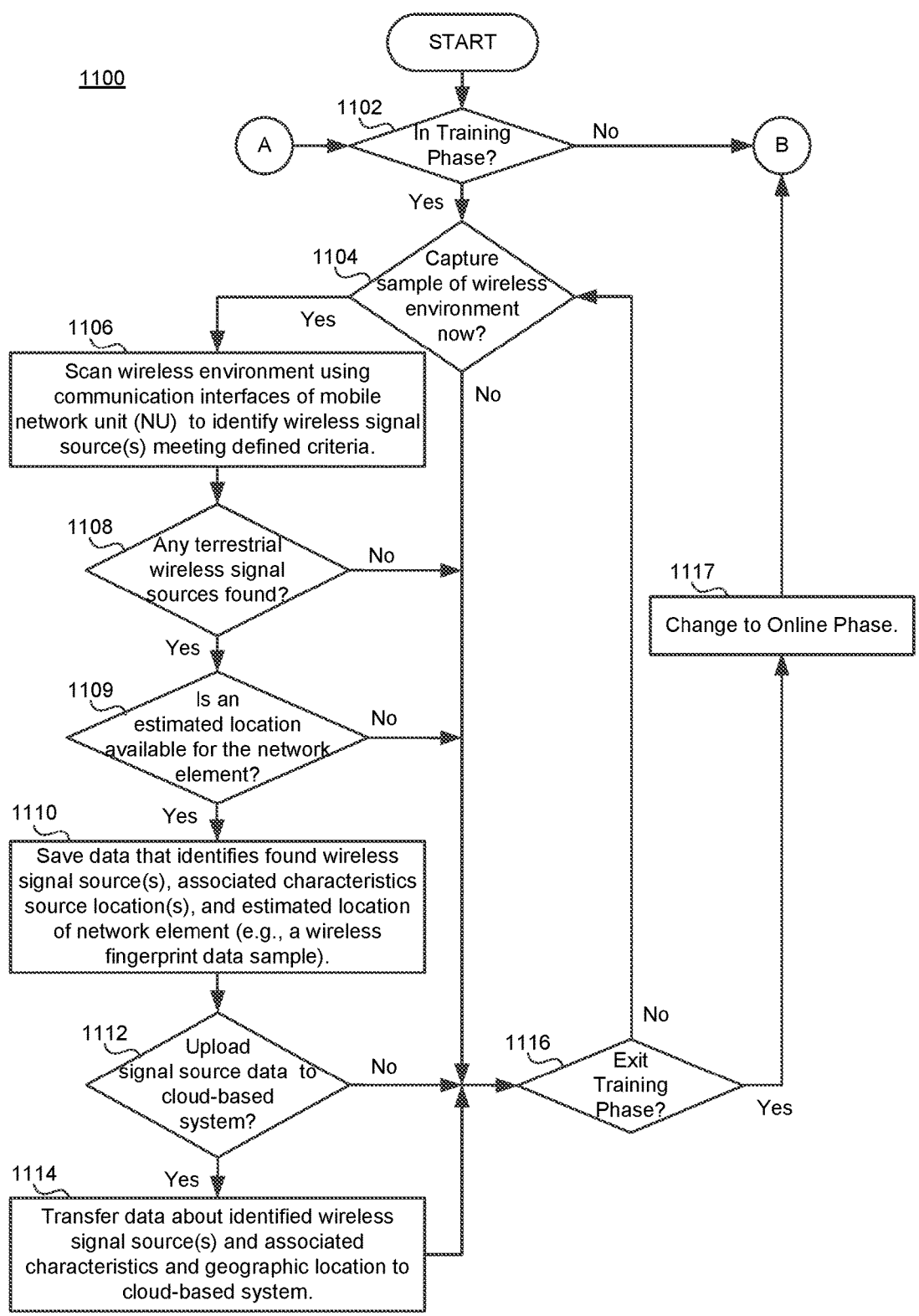
FIGS. 11A-11C show a flowchart for an example method of performing vehicular positioning based on wireless fingerprinting data in a network element such as, for example, a network unit, on-board unit, or a mobile access point, in accordance with various aspects of the present disclosure.
Figure 11B:
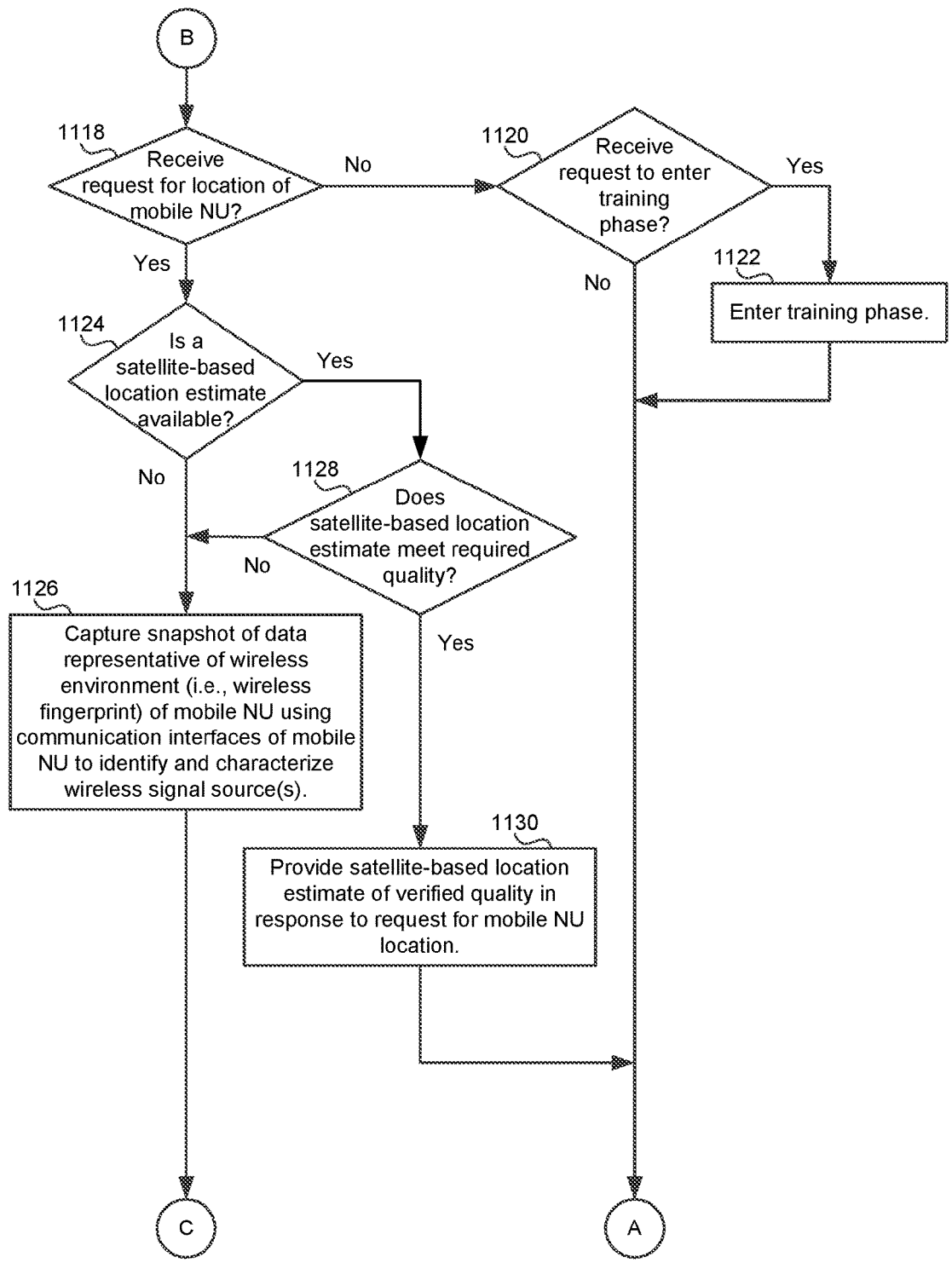
Figure 11C:
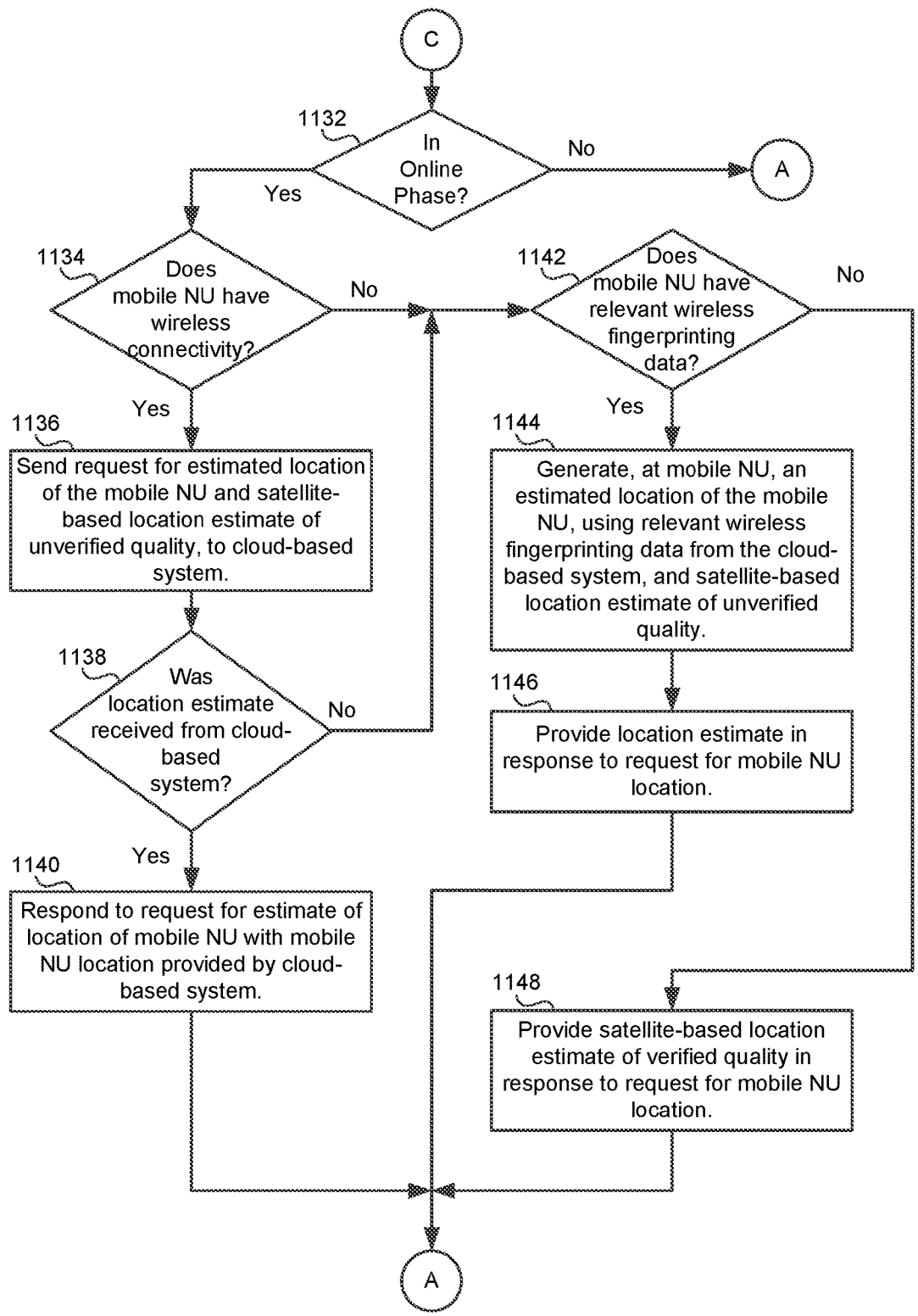

FIGS. 11A-11C show a flowchart 1100 for an example method of performing vehicular positioning based on wireless fingerprinting data in a network element such as, for example, a network unit, on-board unit, or a mobile access point, in accordance with various aspects of the present disclosure. Example network elements in which the method may be employed are described above and shown as the NUs 724, 725 of the vehicles 742, 741, respectively, and the NUs of access points 726, 737, 738 in the communication network of FIG. 7. It should be noted that, while the actions related to the process of producing a location estimate using a collection of wireless fingerprint sample data, a current "wireless snapshot," and optional satellite-based location estimate(s) may be performed by a cloud-based system, such a process may also be performed by any of a number of different elements of a network as described herein including, for example, a suitably equipped fixed AP, mobile AP, OBU, RSU, NC/MC, etc., without departing from the spirit and scope of the present disclosure. The actions of the method of FIGS. 11A-11C may be performed by one or more processors of a network element, and may be implemented as one or more processes executing on such one or more processors, wherein the one or more processes may run continually or intermittently as needed, once initiated. The method of FIGS. 11A-11C begins at block 1102.

At block 1102, the method may determine whether the network element (e.g., an NU, OBU, mobile AP) is operating currently in what may be referred to herein as "training phase," discussed above. If the network element is not operating in "training phase" (i.e., in accordance with aspects of the present disclosure, the network element may alternatively be operating in "online phase"), the method may proceed to block 1118 of FIG. 11B, discussed below. If, however, the network element is operating in "training phase," the method continues at block 1104, where the method may determine whether a sample of the wireless environment of the network element is to be captured. The network element performing the method may, for example, determine that a sample of the wireless environment is to be captured based upon an amount of time that has passed since startup of the network element or since the last sample of the wireless environment was captured, based upon a physical distance that has been traveled since startup of the network element or since the last sample of the wireless environment was captured, and/or based upon whether the network element has moved within a certain proximity distance of a particular geographic location or within or outside of a defined boundary. It should be noted that the capture of samples of the wireless environment of a service area by a number of vehicles may not be choreographed or coordinated (e.g., when the MAPs/OBUs/NUs are in vehicles being driven for purposes other than acquisition of wireless environment data), and may be performed by a number of network elements in respective vehicles travelling in various directions about various portions of a given geographic area or region.

If it is determined, at block 1104, that a sample of the wireless environment is not to be captured, the method may continue at block 1116, described below. If, however, it is determined, at block 1104, that a sample of the wireless environment is to be captured, the method continues at block 1106. It should be noted that, in accordance with various aspects of the present disclosure, the capture of samples of the wireless environment may not be choreographed, and may be performed by a number of network elements in respective vehicles travelling in various directions about a given geographic area or region, without regard to a need for the capture of samples in any certain portion of the given geographic area driven by the operators of the vehicles. In this manner, the capture of samples identifying signal sources of the wireless environment may, in effect, be crowdsourced, as the operators of the vehicles the network element of which are performing captures of information about wireless sources and characteristics may be completely unaware of the gathering and communication of such information.

At block 1106, the network element performing the method may use one or more wireless (radio frequency (RF)) communication interfaces to scan the wireless environment of the network element, to receive, identify, and save information for any wireless signal sources meeting defined criteria. In accordance with various aspects of the present disclosure, the defined criteria may include, for example, signals that appear within a certain portion of RF spectrum or at a certain frequency, signals that are received at or above a certain received signal strength (RSSI), signals that are modulated using certain types of modulation (e.g., differential phase shift keying (DPSK), quadrature phase shift keying (QPSK), orthogonal frequency division multiplex (OFDM), etc.), and/or certain communication encodings/protocols (e.g., CDMA, TDMA, GSM, LTA, direct sequence spread spectrum (DSSS), frequency hopped spread spectrum (FHSS), etc.), parameters encoded/modulated on those wireless signals, and signal timings and data/symbol rates that aid in uniquely identifying the signal sources. It should be noted that many different aspects of wireless signals may be characterized and represented as data associated with a radio frequency signal source, and the examples provided herein are not intended to act as limitations, but are merely examples of RF signal characteristics that may be represented by data as part of wireless fingerprint sample data or wireless snapshot data.

Next, at block 1108, a determination is made as to whether any terrestrial wireless signal sources were found that met the defined criteria. If, at block 1108, it is determined that no terrestrial wireless signal sources were found during the scan of the wireless environment of the network element, the method then continues at block 1116, described below. If, however, it is determined, at block 1108, that one or more terrestrial wireless signal sources were found during the scan of the wireless environment of the network element, then the method continues at block 1109, where the method determines whether an estimated location of the network element performing the method is available. Such a location estimate may, for example, be available from a receiver of signals of a satellite-based navigation system (e.g., GNSS, GPS), or may be available from other navigational techniques (e.g., inertial, time-of-arrival using signals from other network elements at known locations, etc.). If no estimated location of the network element performing the method (e.g., a mobile AP) is available, the method then continues at block 1116. If, however, an estimated location of the network element is available, then the method proceeds to block 1110, where data identifying the wireless signal source(s), data representative of one or more associated characteristics of the found wireless signal source(s) (e.g., characteristics of the received signals such as those types of data of the defined criteria), the current date and/or time, and the current geographic location of the network element (e.g., which may be mobile/moving) at the time the wireless signal source(s) were found are then associated with one another (i.e., as a wireless fingerprint sample or "wireless snapshot"), and saved in storage of the network element.

Next, at block 1112, a determination is made as to whether to upload the data about wireless signal sources (i.e., the wireless fingerprint sample data) to a cloud-based system for storage and analysis. If, at block 1112, it is determined that conditions at the network element (e.g., the cost, bitrate, reliability of available wireless networks for use during the upload; the current demand on computing, wireless communication, sensor data acquisition and/or processing resources of the network element; and/or configuration information at the network element received from the cloud based system) are such that an upload of the wireless fingerprint sample data is not to be performed at this time, the method of FIGS. 11A-11C may continue at block 1116, described below. If, however, it is determined, at block 1112, that conditions at the network element are such that an upload of the wireless fingerprint sample data is to be performed at the current time then, at block 1114, the network element may transfer collected wireless fingerprint sample data from storage of the network element to a cloud-based system (e.g., the Cloud of FIG. 1 or Cloud 760 of FIG. 7). The method then continues at block 1116, described below.

At block 1116, the method may determine whether the method is to exit the "training phase." The "training phase" may be exited when, for example, other aspects of the network element have determined that no additional wireless fingerprint sample data is needed. This may occur, for example, when the network element and/or a cloud-based system determines that an amount of geographic area served by the network element in which the accuracy of location estimates derived using wireless fingerprint sample data is unacceptable, is less than a defined threshold. Unacceptable accuracy may occur, for example, when location estimates derived using wireless fingerprint sample data for certain locations are determined to lie outside of a defined maximum distance from an actual geographic location of the network element, where the actual geographic location may be determined or defined by, for example, mapping data and/or by satellite-based or other geo-location approaches that are operable at acceptable measures of accuracy at those certain locations. If it is determined, at block 1116, that the network element is to exit the "training phase," the method may then, at block 1117, change to "on-line phase" (e.g., by changing a program variable/hardware register that identifies whether the software/firmware/logic is operating in the "training phase" or the "online phase"), and may then proceed to block 1118 of FIG. 11B, described below. If, however, it is determined, at block 1116, that the network element is to remain in the "training phase," the method may continue at block 1102, described above.

At block 1118 of FIG. 11B, the method of FIGS. 11A-11C, operating now in the "online phase," may make a determination as to whether a request for an estimate of the location of the network element performing the method (e.g., an NU, an OBU, or a mobile AP) has been received. Such a request may, for example, originate from a software application also running on the one or more processors of the network element, or may be received by the network element from, for example, another network element or a cloud-based system, as described herein. If, at block 1118, it is determined that a request for a location estimate has not been received, then the method of FIG. 11B may proceed to block 1120, where the method may determine whether the one or more processors performing the method have received a request to enter the "training phase," described above. If it is determined, at block 1120, that a request to enter the "training phase" has not been received, then the method may transfer control to block 1102 of FIG. 11A, described above. If, however, it is determined at block 1120 that a request to enter "training phase" has been received then, at block 1122, the method may enter the "training phase" (e.g., by changing a program variable/hardware register that identifies whether the software/firmware/logic is operating in "training phase" or "online phase" to the "training phase"), and the method may then proceed to block 1102 of FIG. 11A, described above.)

If, at block 1118, it was determined that a request for an estimate of the location of the network element performing the method (e.g., an NU, an OBU, or a mobile AP) was received, the method may then continue at block 1124, where the one or more processors performing the method may determine whether a satellite-based location estimate is available. A satellite-based location estimate may be available when, for example, the network element is equipped with an operating GNSS satellite receiver that currently has a line-of-sight view of a certain minimum number (e.g., four) of satellites of the GNSS being used. If, at block 1124, it is determined that a satellite-based location estimate is not available, the method may proceed at block 1126, described below. A satellite-based location estimate may not be available when, for example, the network element is not equipped with a GNSS receiver, the network element is equipped with a GNSS receiver but the GNSS receiver is either not functional, or an insufficient number of satellites are within line-of-sight view of the GNSS receiver antenna. If, however, at block 1124, it is determined that a satellite-based location estimate is available, then the method may continue at block 1128, described below.

At block 1126, the network element performing the method may capture data of a current wireless fingerprint sample, also referred to herein as a "wireless snapshot," using the wireless communication interfaces of the network element, as described above, to receive, identify, and characterize the various wireless (i.e., radio frequency) signal sources in the wireless environment of the network element. The method may then continue at block 1132 of FIG. 11C.

At block 1128, the method may determine whether the available satellite-based location estimate meets a required or defined level or degree (i.e., measure) of quality (e.g., accuracy). A GNSS receiver, or functionality of the network element, may use various operating parameters of the visible satellites (e.g., received signal strength for each satellite, a number of satellites in view, dilution of precision (DOP) information, and various other satellite system parameters) to determine a measure of quality (e.g., accuracy) of location estimates (e.g., "fixes") at any point in time. If, at block 1128, it is determined that the available satellite-based location estimate meets the required or defined measure of quality, it may be assumed that the satellite-based location estimate is at least as accurate as a location estimate derived using wireless fingerprint sample data, and the method may then, at block 1130, provide the satellite-based location estimate, meeting the required or defined measure of quality, in response to the request for a location estimate for the network element. The method may then proceed to block 1102 of FIG. 11A. If, however, at block 1128, it is determined that the available satellite-based location estimate does not meet the required or defined measure of quality, then method may continue at block 1126, described above. It should be noted that the required measure of quality, and any parameters used to specify the required or defined quality of a satellite-based location estimate, may be configured by a system that is remote from the network elements performing the quality decision such as, for example, a cloud-based system, as described herein.

At block 1132 of FIG. 11C, the method determines whether the method is in "online phase." If it is determined that the method of FIGS. 11A-11C is not in the "online phase," the method then continues at block 1102 of FIG. 11A, which was described above. If, however, it is determined that the method of FIGS. 11A-11C is in "online phase," the method continues at block 1134, where the method determines whether the network element (e.g., NU, OBU, mobile AP) currently has wireless connectivity to the Internet, and in particular, to a cloud-based system supporting the use of a collection of wireless fingerprint sample data to produce a location estimate from a current wireless snapshot provided by the network element performing the method. If, at block 1134, it is determined that the network element (e.g., NU, OBU, mobile AP) currently does not have wireless connectivity to the cloud-based system, the method then proceeds to block 1142, described below. If, however, it is determined, at block 1134, that the network element currently does have wireless connectivity to the cloud-based system, the method continues at block 1136.

At block 1136, the network element (e.g., NU, OBU, mobile AP) may send a request for a location estimate to the cloud-based system (e.g., or other network element capable of generating a location estimate as described herein), along with a satellite-based location estimate of unverified quality (i.e., that may not or does not meet a required or defined measure of quality (e.g., accuracy)). The method then continues at block 1138, where the method determines whether a location estimate was received from the cloud-based (or other) system in response to the request. This determination may, for example, allow a certain amount of time to pass for the cloud-based (or other) system to respond to the request, before the method progresses further. If, at block 1138, it is determined that a location estimate has not been received from the cloud-based (or other) system, the method may then proceed to block 1142, described below. If, however, the method, at block 1138, determined that a location estimate has been received from the cloud-based (or other) system, the method proceeds to block 1140, where the received location estimate is provided to the source of the request for a location estimate (e.g., a process or software program on the network element performing the method of FIGS. 11A-11C), and the method may then transfer control to block 1102, shown in FIG. 11A.

At block 1142, the method may determine whether the network element (e.g., NU, OBU, mobile AP) has a relevant collection of wireless fingerprint sample data able to be used in producing location estimates. The term relevant may be used in this context to refer to a collection of wireless fingerprint sample data for the geographic area for which the network element may be requested to produce a location estimate. As described herein, such a collection of indexed wireless fingerprint sample data may, for example, be downloaded from a cloud-based system that produces such a collection, as described herein, to enable the network element to produce location estimates when connectivity to the cloud-based (or other) system is not available. If it is determined, at block 1142, that the network element does not have an indexed collection of relevant wireless fingerprint data, then the method of FIG. 11C may continue at block 1148, described below. If, however, it is determined, at block 1142, that the network element does have an indexed collection of relevant wireless fingerprint data, then the method of FIG. 11C may continue at block 1144.

At block 1144, the method may generate/produce, at the network element performing the method of FIGS. 11A-11C, an estimate of the location of the network element, using current wireless snapshot, the collection of relevant wireless fingerprint sample data (e.g., previously downloaded from a cloud-based system), and a satellite-based location estimate of unverified quality. Then, at block 1146, the network element performing the method may provide the location estimate to the source of the request for a location estimate (e.g., a process or software program on the network element performing the method of FIGS. 11A-11C), and the method may then transfer control to block 1102, shown in FIG. 11A.

At block 1148, having determined at block 1142 that the network element performing the method does not have a suitable collection of relevant wireless fingerprint sample data, the network element may simply provide the satellite-based location estimate of unverified quality (i.e., not meeting defined or required quality (e.g., accuracy)) to the source of the request for a location estimate (e.g., a process or software program on the network element performing the method of FIGS. 11A-11C), and the method may then transfer control to block 1102, shown in FIG. 11A.

Figure 12A:
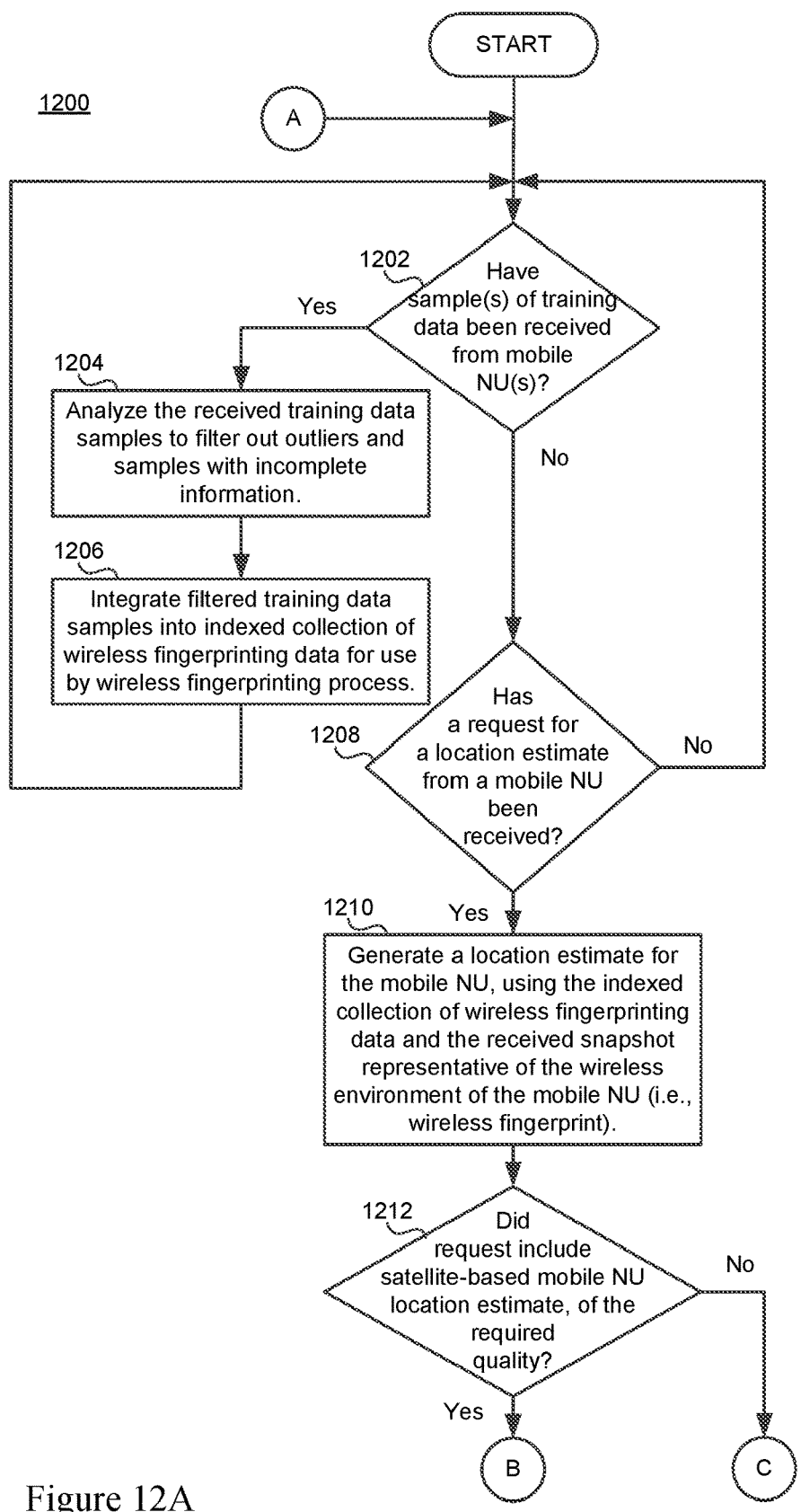
FIGS. 12A-12B show a flowchart for an example method of performing vehicular positioning based on wireless fingerprinting data in a cloud-based system or other network element, in accordance with various aspects of the present disclosure.
Figure 12B:
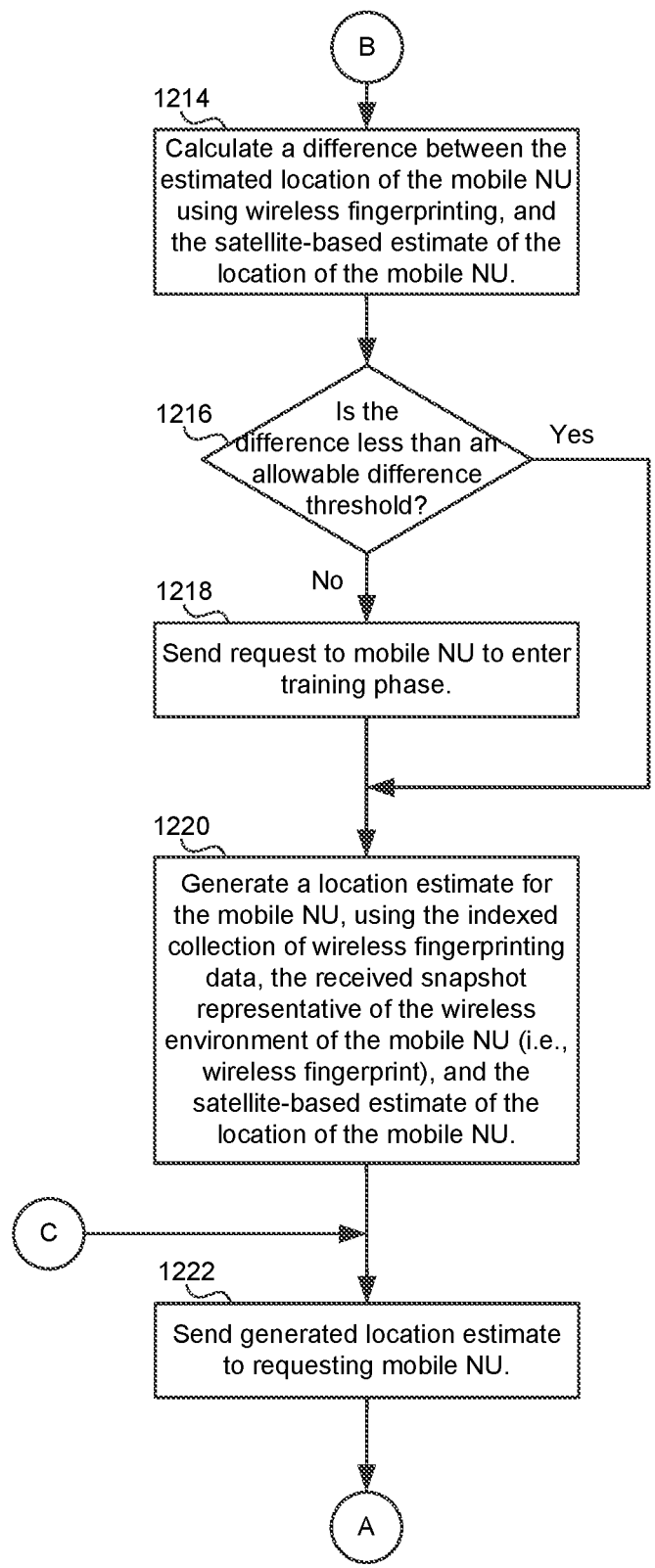

FIGS. 12A-12B show a flowchart 1200 for an example method of performing vehicular positioning based on wireless fingerprinting data in a cloud-based system or other network element, in accordance with various aspects of the present disclosure. Aspects of the method of FIGS. 12A-12B may be performed by, for example, the Cloud of FIG. 1, the Cloud 760 of FIG. 7, and/or any other elements of the networks described above in relation to or shown in FIGS. 1 through 10 of the present disclosure. It should be noted that, while the actions related to the process of producing a location estimate using a collection of wireless fingerprint sample data, a current "wireless snapshot," and optional satellite-based or otherwise sourced location estimates may be performed by a cloud-based system, such a process may be performed by any of a number of different elements of a network as described herein including, for example, a suitably equipped fixed AP, mobile AP, OBU, RSU, NC/MC, etc., without departing from the spirit and scope of the present disclosure. The actions of the method of FIGS. 12A-12B may be performed by one or more processors of a network element, and may be implemented as one or more processes executing on such one or more processors, wherein the one or more processes may run continually or intermittently, as needed, once initiated. The method of FIGS. 12A-12B begins at block 1202.

At block 1202, the method of FIGS. 12A-12B may determine whether sample(s) of training data (e.g., wireless fingerprint sample data) have been received from one or more mobile network elements (e.g., NUs, mobile APs, OBUs). If it is determined, at block 1202, that training data of one or more wireless fingerprint samples has been received from mobile element(s), the method then continues at block 1204, where the method may analyze the received training data samples, by filtering out "outliers" and samples with incomplete (e.g., missing) information. The term "outliers" may be used herein to refer to wireless fingerprint data samples for which one or more data elements or parameters are inconsistent with others of the sample(s), or which are out-of-range for the measurement that they represent such as, by way of example and not limitation, geographic coordinates that are outside of a range of valid values, an altitude value that is outside of a reasonable range of values or invalid at the location defined by the geographic coordinates of the sample, satellite signal strengths out of range or unacceptable, signal frequencies outside of those frequencies of interest for this use, etc. The method may then, at block 1206, integrate the filtered training data into a collection of wireless fingerprint sample data for use by the location estimation process of the present disclosure. The samples in the collection of wireless fingerprint samples data may be indexed according to one or more of the common data elements or parameters of each wireless fingerprint sample such as, by way of example and not limitation, wireless signal source location (e.g., latitude, longitude), wireless signal source signal frequency, wireless signal source geographic location, wireless signal source type, to name just a few. The method may then continue at block 1202, described above.

If, at block 1202, it is determined that training data has not been received from mobile element(s), the method may then continue at block 1208, where a determination may be made as to whether a request for a location estimate has been received from a mobile network element. If, at block 1208, it is determined that a request for a location estimate has been received, then at block 1210, the method may produce/generate a location estimate for the requesting network element (e.g., an NU, OBU, mobile AP), using the indexed collection of wireless fingerprint sample data discussed above, and the received wireless snapshot representative of the wireless environment of the network element.

At block 1212, the method may determine whether the location request received by the network element included a satellite-based or otherwise-sourced location estimate meeting a defined or required level or degree of quality (e.g., accuracy). If it is determined, at block 1212, that the location request received by the network element did not include a satellite-based or otherwise-sourced location estimate meeting the defined level or degree of quality, the method may then continue at block 1222 of FIG. 12B. If, however, it was determined, at block 1212, that the location request received by the network element did include a satellite-based or otherwise-sourced location estimate meeting the defined or required level or degree of quality, the method may then continue at block 1214 of FIG. 12B.

At block 1214 of FIG. 12B, the method may cause one or more processors performing the method to calculate a difference (e.g., an amount of "error") between the estimated location of the mobile network element (e.g., NU, OBU, mobile AP) produced using the collection of wireless fingerprint sample data, and the satellite-based or otherwise-sourced location estimate meeting the defined or required level or degree of quality (e.g., accuracy). Then, at block 1216, the method may determine if the calculated difference is less than or equal to an allowable difference threshold, to determine whether the use of wireless fingerprint sample data in producing location estimates is sufficiently accurate in the geographic area or region in which the mobile network element that requested a location estimate, is currently operating. If it is determined, at block 1216, that the calculated difference is less than or equal to the allowable difference threshold, the method may proceed to block 1220, discussed below. If, however, it is found at block 1216 that the calculated difference is not less than or equal to the allowable difference threshold (i.e., is greater than the allowable difference threshold), then the method of FIGS. 12A-12B may, for example, at block 1218, request that the mobile network element that requested the location estimate enter the "training phase." In this way, the determination that the accuracy of location estimates produced using the collection of wireless fingerprint sample data is less that the defined or required level or degree of quality may trigger the acquisition and integration of additional wireless fingerprint sample data into the collection used in generating location estimate(s), in an effort to more completely characterize or map the wireless signal sources in the geographic area or region in which the collection of wireless fingerprint sample data is found to be unreliable or to produce location estimates of unacceptable quality. It should be noted that such a request to enter "training phase" may be sent directly to the functional components of a mobile network element by other functional elements of the requesting mobile network element, or may be send from the requesting mobile network element to, for example, a cloud-based system that may manage or influence the current phase of operation (e.g., 'training phase" or "online phase") of the requesting mobile network element. As previously discussed, a mobile network element may, in order to be able to produce a location estimate using a wireless snapshot, have the functionality described herein to download (e.g., from a cloud-based system) and/or independently collect wireless fingerprint sample data for use in producing/generating a location estimate when, for example, network connectivity to the cloud-based functionality for producing location estimates, is unavailable. It should also be noted that each mobile network element including, by way of example and not limitation, NUs, OBUs, and/or mobile APs may, at any point in time, operate in "training phase," independent from the current operating phase of other mobile network elements, because the accuracy of location estimates may vary across the geographic area served by the mobile network element(s) of a network in accordance with various aspects of the present disclosure, and additional wireless fingerprint sample data may be needed to "fill in" a map or characterization of the wireless environment represented by the collection of wireless fingerprint sample data described herein.

At block 1220, the method of FIGS. 12A-12B may produce/generate a location estimate for the requesting network element (e.g., an NU, OBU, mobile AP), using the indexed collection of wireless fingerprint sample data discussed above, using the received wireless snapshot representative of the wireless environment of the network element, and the satellite or otherwise-based estimate of the location of the mobile network element.

At block 1222, the method may send the location estimate to the requesting mobile network element, and then may proceed to block 1202, discussed above.

Figure 13:
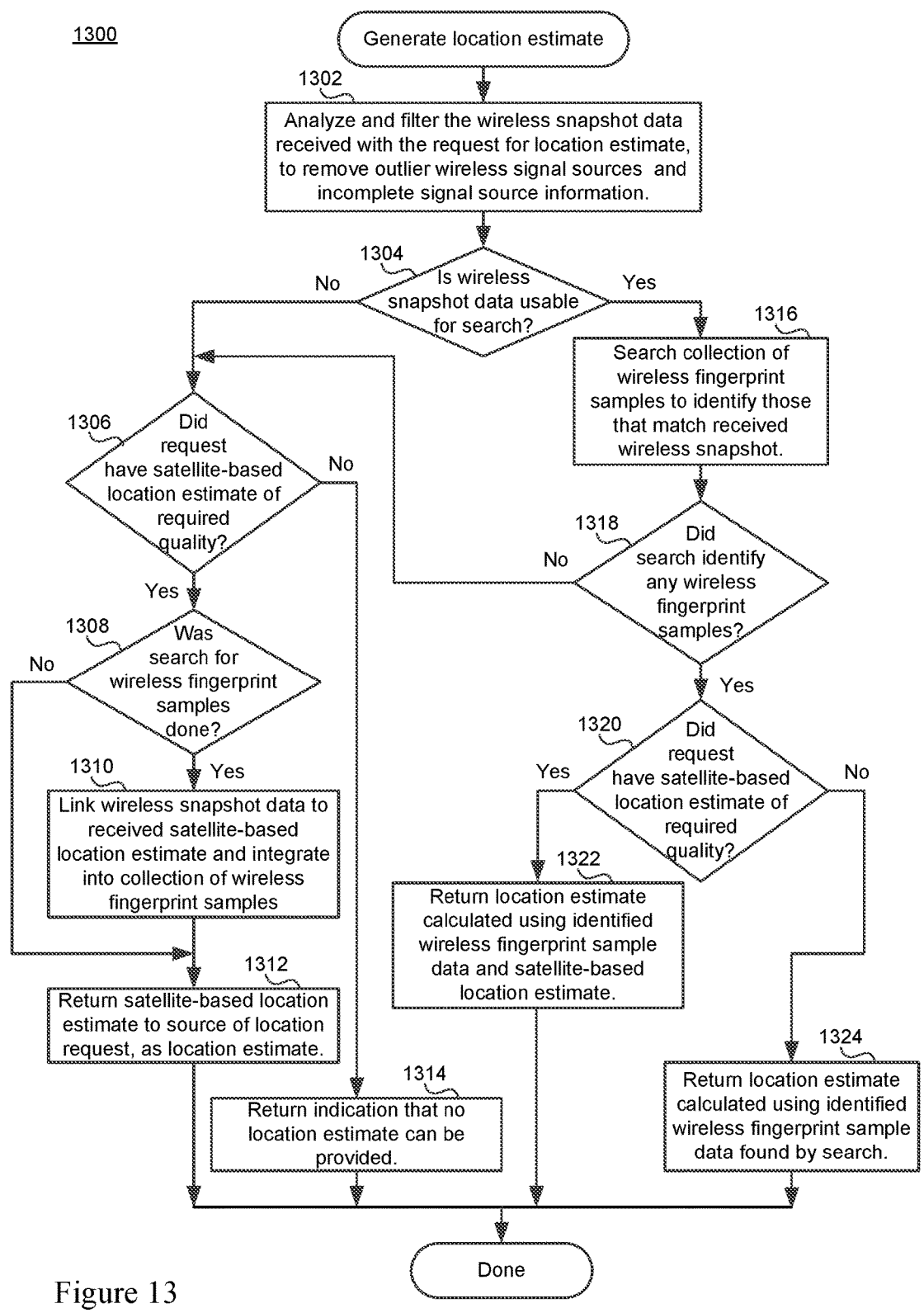
FIG. 13 is a flowchart of an example method of generating a location estimate, in accordance with various aspects of the present disclosure.

FIG. 13 is a flowchart 1300 of an example method of generating a location estimate, in accordance with various aspects of the present disclosure. Various aspects of the method of FIG. 13 may, for example, correspond to actions of block 1210 and/or block 1220 of FIGS. 12A-12B. Aspects of the method of FIG. 13 may be performed by, for example, the Cloud of FIG. 1, the Cloud 760 of FIG. 7, and/or any other elements of the networks described above in relation to and/or shown in FIGS. 1 through 12B of the present disclosure. It should be noted that, while the actions related to the process of generating/producing a location estimate using a collection of wireless fingerprint sample data, a current "wireless snapshot," and optional satellite-based or otherwise sourced location estimates may be performed by a cloud-based system, such a process may be performed by any of a number of different elements of a network as described herein including, for example, a suitably equipped fixed AP, mobile AP, OBU, RSU, NC/MC, etc., without departing from the spirit and scope of the present disclosure. The actions of the method of FIG. 13 may be performed by one or more processors of a network element, and may be implemented as one or more processes executing on the one or more processors, wherein the one or more processes may run continually or intermittently, as needed, once initiated. The actions of FIG. 13 begin at block 1302.

At block 1302, the method of FIG. 13 may analyze and filter the wireless snapshot data received for the request for a location estimate, to remove outlier wireless signal sources and incomplete signal source information. In this way, a wireless snapshot that contains one or more data elements or parameters that have invalid values or are missing information may be detected and not used to produce what may be an invalid location estimate. The method then proceeds to block 1304, where the method may determine whether the wireless snapshot data is usable for performing a search of the collection of wireless fingerprint sample data. If, at block 1304, it is determined that the data of the wireless snapshot is usable in performing a search of the collection of wireless fingerprint sample data, the method may proceed to block 1316, discussed below. If, however, it is determined at block 1304 that the data of the wireless snapshot is not usable in performing a search of the collection of wireless fingerprint sample data, the method may proceed to block 1306.

At block 1306, the method determines whether the request for the location estimate was accompanied by a satellite-based (or otherwise sourced) location estimate of a defined or require level or degree of quality. If it is determined, at block 1306, that such a location estimate was not received for the requested location estimate, the method proceeds to block 1314, discussed below. If, however, it is determined at block 1306 that a location estimate of a defined or required level or degree of quality was received for the requested location estimate, the method may then proceed to block 1308, where the method determines whether a search of the collection of wireless fingerprint sample data was performed at block 1316, discussed below in regards to the other path exiting block 1304. If, at block 1308, it is determined that a search of the collection of wireless fingerprint sample data was not done at block 1316, the method may then proceed to block 1312, discussed below. If, however, it is determined that a search of the collection of wireless fingerprint sample data was done at block 1316 then, at block 1310, the method may link the data of the wireless snapshot to the received satellite-based (or otherwise sourced) location estimate of the define or required level or degree of quality, and integrate the linked information into the collection of wireless fingerprint sample data. In this way, new wireless fingerprint sample data (in this instance, captured as a wireless snapshot for the location request, and analyzed and filtered to remote outliers and incomplete information) and an associated satellite-based location estimate of required or defined level or degree of quality, may be added to the collection of wireless fingerprint sample data during the "online phase," where none previously existed. The method may then continue at block 1312.

At block 1312, the method of FIG. 13 may return, to the network element that requested the location estimate, a satellite-based location estimate that is of a level or degree of quality of defined or required by the operators of the network of the present disclosure. The method of FIG. 13 is then finished performing the method of generating/providing a requested location estimate.

At block 1314, having found at block 1304 that the data of the received wireless snapshot is unusable for searching the collection of wireless fingerprint sample data, and having found at block 1306 that any satellite-based location estimate received with the request for location estimate is not of the defined or required quality, the method may return to the requesting network element, an indication that the method is unable to generate or provide a location estimate. The method of FIG. 13 is then finished performing the method of generating/providing a requested location estimate.

Figure 14A:
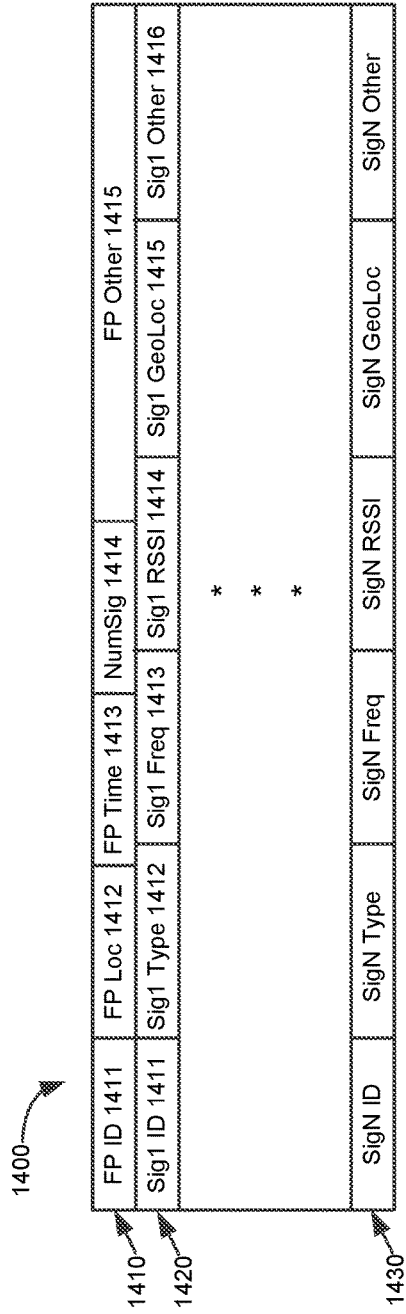
FIG. 14A is a diagram showing various data elements or parameters and an arrangement for an example wireless fingerprint sample 1400, in accordance with various aspects of the present disclosure.
Figure 14B:
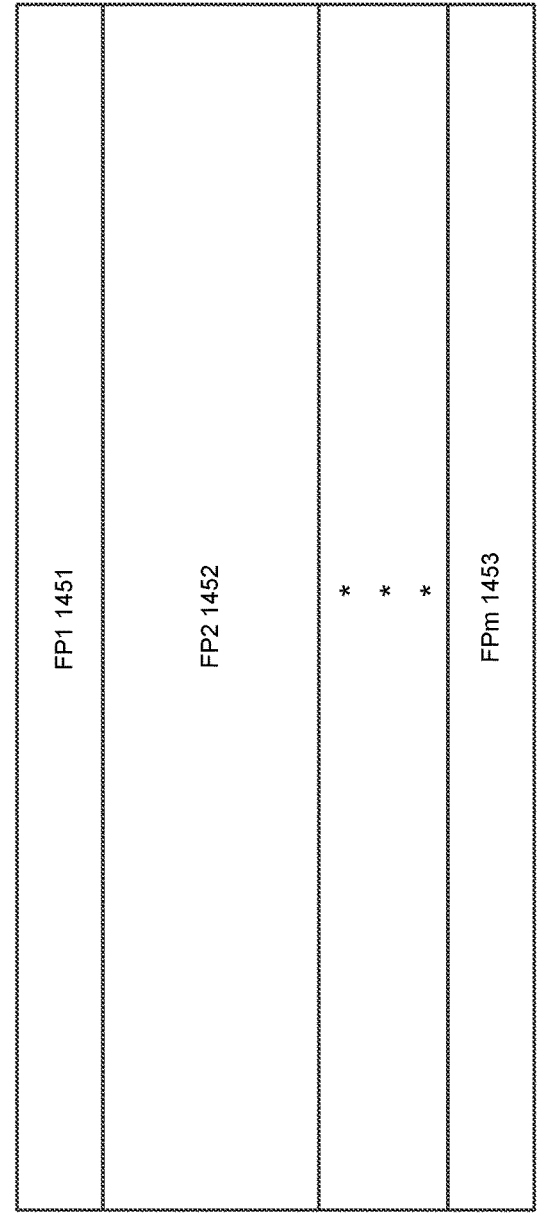
FIG. 14B is a diagram showing an example collection of wireless fingerprint sample data entries FP1, FP2, and FPm that may, for example, correspond to the example wireless fingerprint sample of FIG. 14A, in accordance with various aspects of the present disclosure.

At block 1316, having determined that data of a wireless snapshot that accompanied the received request for a location estimate is usable, the method may then search the collection of wireless fingerprint sample data, to identify any wireless fingerprint samples that match the received wireless snapshot. The criteria that is used to determine what constitutes a match of the wireless snapshot with an entry in the collection of wireless fingerprint sample data may include, by way of example and not limitation, that a certain percentage or fraction of the wireless sources identified in the wireless snapshot data are identified in the wireless fingerprint sample data, and/or that a satellite-based or otherwise sourced location estimate that accompanied the wireless snapshot is within a certain geographic distance from a geographic location parameter of the wireless fingerprint sample data. A mentioned above, the wireless fingerprint samples in the collection may be index using one or more of the data elements or parameters of the wireless fingerprint sample data of the entries in the collection. FIGS. 14A-14B, discussed below, provide an example arrangement of an example set of data elements/parameters of a wireless fingerprint sample.

Next, at block 1318, the method of FIG. 13 may determine whether the search at block 1316, using the wireless snapshot received with the request for a location estimate, was able to identify any wireless fingerprint samples meeting the search criteria. If no wireless fingerprint samples meeting the search criteria are found in the collection, the method of FIG. 13 may then proceed to block 1306, discussed above. If, however, at block 1318, it is determined that one or more wireless fingerprint samples meeting the search criteria using the received wireless snapshot have been found, then the method may then proceed to block 1320.

At block 1320, the method determines whether the received request for a location estimate was accompanied by a satellite-based (or otherwise sourced) location estimate, for the requesting network element, that meets the defined or required level or degree of quality. As discussed above, the quality (e.g., accuracy) of a satellite-based location estimate (e.g., "fix") may be based upon one or more parameters of the geometry of the satellites in line-of-site view of the network element at which a location estimate for which a location estimate may be generated. The GNSS/GPS receiver of such a network element may provide parameters that may be used to determine the effects of, for example, the geometry of the visible satellites relative to the receiver, the number of usable satellites, and other factors, upon the accuracy of a satellite-based location estimate. If, at block 1320, it is determined that a satellite-based (or otherwise sourced) location estimate that meets the defined or required level or degree of quality did not accompany the request for a location estimate, then the method may proceed to block 1324, where the method may return a location estimate calculated using the wireless fingerprint sample data found by the search of the collection of wireless fingerprint sample data. The calculation of the location estimate may, for example, determine a centroid of the geographic locations identified in the identified wireless fingerprint sample data. It should be noted that a satellite-based location estimate that does not meet a required or defined level or degree of quality (e.g., accuracy) may, in certain circumstances, be employed in combination with wireless fingerprint sample data in producing/generating a location estimate, depending upon the reason that the satellite-based location estimate fails to meet the required or defined level or degree of quality. The method of FIG. 13 is then finished performing the method of generating/providing a requested location estimate. If, however, at block 1320, it is determined that a satellite-based (or otherwise sourced) location estimate that meets the defined or required level or degree of quality did accompany the request for a location estimate, then the method may proceed to block 1322, where the method may return a location estimate calculated using the wireless fingerprint sample data found by the search of the collection of wireless fingerprint sample data, and the satellite-based (or otherwise sourced) location estimate that may have accompanied the request for a location estimate. In this case, the calculation of the location estimate may, for example, determine a centroid of the geographic locations identified in the identified wireless fingerprint sample data and the satellite-based or otherwise sourced location estimate for the network element about which the location estimate is requested. The method of FIG. 13 is then finished performing the method of generating/providing a requested location estimate.

FIG. 14A is a diagram showing an arrangement of various data elements or parameters for an example wireless fingerprint sample 1400, in accordance with various aspects of the present disclosure. The example wireless fingerprint sample 1400 of FIG. 14A includes a wireless fingerprint sample header 1410, and a number of wireless fingerprint sample signal sources 1420, 1430. The example wireless fingerprint sample header 1410 of FIG. 14A includes a number of data elements or parameters such as, for example, a wireless fingerprint identifier (ID) FP ID 1411 data element, a wireless fingerprint location FP Loc 1412 data element, a wireless fingerprint time FP Time 1413 data element, a number of signal sources NumSig 1414 data element, and one or more other data elements FP Other 1415.

The FP ID 1411 data element may, for example, comprise a network-unique value incorporating an identifier of the network element that captured the wireless fingerprint sample data. The FP Loc 1412 data element may, for example, comprise a current estimated location of the network element that captured the wireless fingerprint sample data. The FP Time 1413 data element may, for example, comprise a time stamp (e.g., GNSS/GPS time) at which the wireless fingerprint sample data was captured. The NumSig 1414 data element may, for example, comprise a value representing the number of wireless fingerprint sample signal sources contained in the wireless fingerprint sample 1400, as a wireless fingerprint sample may comprise data for one or more wireless signal sources. The FP Other 1415 data element may, for example, comprise any other parameters or data values that may be suitable for use in a particular implementation in accordance with the present disclosure.

Each of the wireless fingerprint sample signal source entries 1420, 1430 may be added to the wireless fingerprint sample, upon discovery of a different wireless signal source during scanning of the wireless network environment of a network element of the present disclosure. As shown in FIG. 14A, the example wireless fingerprint sample signal source entry 1420 of FIG. 14A comprises a wireless signal source Sig1 ID 1411 data element, a wireless signal source signal type Sig1 Type data element, a wireless signal source signal frequency Sig1 Freq 1413, a wireless signal source Sig1 RSSI data element, a wireless signal source location Sig1 Loc, and one or more other data elements Sig1 Other 1416. The wireless signal source Sig1 ID 1411 data element may, for example, comprise a network-unique value that may be based on the location, the radio frequency, and the type of the signal source. The wireless signal source signal type Sig1 Type data element may, for example, comprise a value representative of the type of signal (e.g., commercial radio, TV broadcast; cellular (e.g., 3G, 4G, 5G, GSM, TDMA, and/or CDMA and their service providers, and/or network elements such as fixed APs and/or mobile APs). The wireless signal source signal frequency Sig1 Freq 1413 data element may, for example, comprise a value representative of the radio frequency, range of radio frequencies, or radio frequency band at/in which the signal source was detected. The wireless signal source Sig1 RSSI 1414 data element may, for example, comprise a value representative of the radio frequency signal strength (e.g., received signal power over a certain bandwidth) of the signal received from the signal source. The wireless signal source location Sig1 GeoLoc 1415 data element may, for example, comprise one or more values (e.g., latitude, longitude, altitude, etc.) representative of a geographic location of the signal source, if available. The signals transmitted by some signal sources discussed herein including, for example, network elements such as, by way of example and not limitation, mobile APs and/or fixed APs according to the present disclosure, may contain information identifying the current geographic location of the signal source. In accordance with aspect of the present disclosure, the wireless signal source location Sig1 GeoLoc 1415 data element of the wireless fingerprint sample signal source entries for such a signal source may reflect the geographic location of the signal source, which may be used to more accurately estimate the location of a network element capturing such a signal source during a scan of the wireless environment of the network element. Finally, the one or more other data elements Sig1 Other 1416 may, for example, comprise any other parameters or data values that pertain to characteristics of a wireless signal source that may be suitable for use in a particular implementation of the concepts disclosed herein.

FIG. 14B is a diagram showing an example collection 1450 of wireless fingerprint sample data entries FP1 1451, FP2 1452, and FPm 1453 that may, for example, correspond to the example wireless fingerprint sample 1400 of FIG. 14A, in accordance with various aspects of the present disclosure. The example collection of wireless fingerprint sample data entries 1451, 1452, 1453 of FIG. 14B are represented as occupying different amount of storage, due to a different number of wireless signal sources in each of the wireless fingerprint sample data entries 1451, 1452, 1453. As discussed above, the wireless fingerprint sample data entries 1451, 1452, 1453 may be integrated into the collection, and may be indexed according to values of one or more of the data elements or parameters common to the wireless fingerprint sample data entries 1451, 1452, 1453. Such indexing may involve linking or organizing wireless fingerprint sample data according to the data elements of parameters used for indexing, to enable fast access of related entries in the collection. As also discussed above, such a collection of wireless fingerprint sample data 1450 may reside at a cloud-based system (e.g., at Cloud 100 of FIG. 1 or Cloud 760 of FIG. 7) and may be accessible to all elements of the network of the present disclosure, and/or same or different portions, or all of the collection of wireless fingerprint sample data 1450 may be downloaded to one or more network elements for local use in performing the generation or provision of location estimates, to avoid the load of location-related network traffic, communication costs, and potential inaccessibility associated with the use of a cloud-based resource and collection of wireless fingerprint sample data.

Each of the identified data elements or parameters in a wireless fingerprint sample may be produced by a scanning of the wireless environment and represented as binary data, a string of characters, or any other representation suitable to record the value of the data element or parameter.

As can be appreciated upon studying the present application, a positioning system in accordance with various aspects of the present disclosure works with any wireless communication technology, and works in geographic areas where GNSS-based positioning approaches fail, or lack adequate precision. Aspects of the positioning approach described herein help to provide an immediate position solution, helping GNSS-based positioning systems to achieve a reduced Time-To-First Fix, which typically varies over a large range depending on conditions (e.g., time since last fix, change in GNSS receiver location since last fix, obstructions impairing receiver line of sight view of satellites, etc.), and can act as valuable input to enhance the performance of other positioning systems. In addition, aspects of the present approach leverage what in many applications of an IoMT platform is a potentially large population of wireless fingerprinting data sources and therefore, a comprehensive collection of samples over the geographic region served by the IoMT platform.

The demand for an always reliable and precise positioning system is greater than ever given the value that positioning information from such a positioning system may add to a large number of industries and businesses. The potential applications range from marketing purposes, security, insurance, transportation, and the automotive industry, which is being revolutionized by autonomous vehicles.

The system herein described herein adds value to those applications, whether it is used as a sole positioning solution, or combined with other positioning systems, and can improve the final position precision. Moreover, aspects of the present disclosure can provide position fixes in geographic areas where traditional GNSS-based (e.g., GPS) approaches cannot. For instance, various aspects of the present disclosure are able to provide positioning information for vehicles located in the middle of "container canyons" in a harbor, in closed parking lots, in tunnels, and in harsh, controlled spaces such as a mining site.

In accordance with various aspects of the present disclosure, a position system as described may automatically re-enter a "training phase" when network elements determine that accuracy levels of position solutions have degraded below an acceptable level, and may determine how frequently (e.g., what interval of time between periods of additional training is appropriate) to maintain positioning accuracy based on observed degradation of position solutions. It should be again noted that the examples presented herein that employ radio frequency signals from network elements using DSRC and Wi-Fi wireless communication are intended to illustrate the innovative approaches disclosed, and that the use of DSRC and/or Wi-Fi RF communication does not represent a specific limitation of the present disclosure, as other signal sources may be used as described herein. Further, although the disclosure provides examples of use of Cloud-based positioning resources, aspects of the present disclosure include the use of positioning functionality located in mobile APs employing wireless fingerprinting data gathered from other fixed and mobile network elements. In addition, the innovative techniques described herein may be combined with other positioning approaches to improve the accuracy and reliability of positioning results. For example, various aspects of the present disclosure may be integrated with other positioning systems such as, for example, the positioning approach described in U.S. Provisional Patent Application No. 62/336,891, entitled "Systems and Methods for Vehicular Positioning Based on the Round-Trip Time of DSRC Messages in a Network of Moving Things," filed May 16, 2016, the complete subject matter of which is hereby incorporated herein, in its entirety. Such an integrated approach may assist in the positioning computation by, for example, eliminating possible ambiguities when in doubt between different candidate positions.

A system in accordance with various aspects of the present disclosure enable accuracy and rapid positioning information using wireless fingerprinting by adding signal sources (e.g., FAPs) with accurately determined geographic locations to the myriad of sources (e.g., residential/commercial/public Wi-Fi, government, commercial broadcast radio and television, business band, security, and others) now present, but the accurate geographic locations of which are not necessarily known. A positioning solution according to various aspects of the present disclosure supports the collection and delivery of associated position and wireless environment data, associated parameters, and positioning information to a central/cloud server in near-real time. Aspects of the present disclosure enable the sensing and recording of large volumes of wireless fingerprint sample data and associated parameters on an ongoing basis, limited only by the number of vehicles equipped with MAPs and the variety of paths travelled by MAP-equipped vehicles (i.e., including all possible vehicle directions and routes), in contrast to prior art solutions in which a limited number of vehicles (e.g., one) travel each street in one direction, and do not travel over all traversable geographic locations (e.g., parking lots/garages, private roads, all lanes/exits/entrances of all highways). A system in accordance with aspects of the present disclosure is able to provide a more complete sampling of the wireless environment, and therefore provide a more complete positioning solution, usable over a greater area based on sampling taken on a more frequent update basis, 24 hours a day/7 days a week/365 days a year, an improvement over prior art solutions.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

Various aspects of the present disclosure may be seen in a method of vehicular positioning of nodes of a radio frequency (RF) wireless network comprising a plurality of nodes disposed at respective fixed locations and a plurality of mobile nodes that reside in respective vehicles that move within a service area of the wireless network. Each node of the plurality of nodes may comprise one or more communication interfaces configured for scanning an RF wireless environment of the respective node. Such a method may comprise periodically receiving respective wireless fingerprint sample data generated by each mobile node of the plurality of mobile nodes, where the wireless fingerprint sample data may comprise data elements characterizing RF signals received by the mobile node from RF signal sources during scanning of the RF wireless environment of the mobile node and a corresponding geographic location within the service area at which the RF signals were received. The method may comprise forming a collection of the wireless fingerprint sample data received from the plurality of mobile nodes, and receiving a request for an estimated geographic location of a particular mobile node of the plurality of mobile nodes. The method may further comprise searching the collection using a wireless snapshot comprising data elements characterizing RF signals received in a current RF wireless environment of the particular mobile node, to identify wireless fingerprint samples of the collection that match the data elements of the wireless snapshot; and calculating an estimated location of the particular mobile node using the identified wireless fingerprint sample data.

Each mobile node of the plurality of mobile nodes may comprise a wireless access point configured to provide wireless Internet access to end-user devices, and each node of the plurality of nodes may periodically wirelessly broadcast its current geographic location to other nodes of the network. The scanning of RF signals within the service area of the wireless network may be without regard to a route of travel of a vehicle in which the mobile node resides. The method may further comprise adding the wireless snapshot and a respective estimated location of the particular mobile node to the collection as a wireless fingerprint sample, if the search fails to identify at least one wireless fingerprint sample that matches the wireless snapshot. The collection may be indexed according to one or more of the data elements of each wireless fingerprint sample that characterize a signal source, and the one or more communication interfaces may be configured to scan and characterize RF signal sources comprising an RF signal of an IEEE 802.11p compliant vehicle to vehicle wireless communication standard and an RF signal compliant with a commercial cellular communication standard.

Additional aspects of the present disclosure may be found in a non-transitory computer-readable medium on which is stored instructions executable by one or more processors, where the executable instructions may cause the one or more processors to perform a method of vehicular positioning of nodes of a radio frequency (RF) wireless network comprising a plurality of nodes disposed at respective fixed locations and a plurality of mobile nodes that reside in respective vehicles that move within a service area of the wireless network. Each node of the plurality of nodes may comprise one or more communication interfaces configured for scanning an RF wireless environment of the respective node, and the method may comprise steps of the method described above.

Further aspects of the present disclosure may be observed in a system for vehicular positioning of nodes of a radio frequency (RF) wireless network comprising a plurality of nodes disposed at respective fixed locations and a plurality of mobile nodes that reside in respective vehicles that move within a service area of the wireless network, where each node of the plurality of nodes may comprise one or more communication interfaces configured for scanning an RF wireless environment of the respective node. Such a system may comprise one or more processors operably coupled to storage and communicatively coupled to the plurality of nodes, and the one or more processors may be operable to perform the steps of a method, such as the method described above.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of vehicular positioning of nodes of a radio frequency (RF) wireless network comprising a plurality of nodes disposed at respective fixed locations and a plurality of mobile nodes that reside in respective vehicles that move within a service area of the wireless network, and wherein each node of the plurality of nodes comprises one or more communication interfaces configured for scanning an RF wireless environment of the respective node, the method comprising:

periodically receiving respective wireless fingerprint sample data generated by each mobile node of the plurality of mobile nodes, the wireless fingerprint sample data comprising data elements characterizing RF signals received by the mobile node from RF signal sources during scanning of the RF wireless environment of the mobile node and a corresponding geographic location within the service area at which the RF signals were received;

forming a collection of the wireless fingerprint sample data received from the plurality of mobile nodes;

receiving a request for an estimated geographic location of a particular mobile node of the plurality of mobile nodes;

searching the collection using a wireless snapshot comprising data elements characterizing RF signals received in a current RF wireless environment of the particular mobile node, to identify wireless fingerprint samples of the collection that match the data elements of the wireless snapshot; and calculating an estimated location of the particular mobile node using the identified wireless fingerprint sample data.

2. The method according to claim 1, wherein each mobile node of the plurality of mobile nodes comprises a wireless access point configured to provide wireless Internet access to end-user devices.

3. The method according to claim 1, wherein each node of the plurality of nodes periodically wirelessly broadcasts its current geographic location to other nodes of the network.

4. The method according to claim 1, wherein the scanning of RF signals within the service area of the wireless network is without regard to a route of travel of a vehicle in which the mobile node resides.

5. The method according to claim 1, the method further comprising:

adding the wireless snapshot and a respective estimated location of the particular mobile node to the collection as a wireless fingerprint sample, if the search fails to identify at least one wireless fingerprint sample that matches the wireless snapshot.

6. The method according to claim 1, wherein the collection is indexed according to one or more of the data elements of each wireless fingerprint sample that characterize a signal source.

7. The method according to claim 1, wherein the one or more communication interfaces are configured to scan and characterize RF signal sources comprising an RF signal of an IEEE 802.11p compliant vehicle to vehicle wireless communication standard and an RF signal compliant with a commercial cellular communication standard.

8. A non-transitory computer-readable medium on which is stored instructions executable by one or more processors, the executable instructions causing the one or more processors to perform a method of vehicular positioning of nodes of a radio frequency (RF) wireless network comprising a plurality of nodes disposed at respective fixed locations and a plurality of mobile nodes that reside in respective vehicles that move within a service area of the wireless network, and wherein each node of the plurality of nodes comprises one or more communication interfaces configured for scanning an RF wireless environment of the respective node, the method comprising:
periodically receiving respective wireless fingerprint sample data generated by each mobile node of the plurality of mobile nodes, the wireless fingerprint sample data comprising data elements characterizing RF signals received by the mobile node from RF signal sources during scanning of the RF wireless environment of the mobile node and a corresponding geographic location within the service area at which the RF signals were received;
forming a collection of the wireless fingerprint sample data received from the plurality of mobile nodes;
receiving a request for an estimated geographic location of a particular mobile node of the plurality of mobile nodes;
searching the collection using a wireless snapshot comprising data elements characterizing RF signals received in a current RF wireless environment of the particular mobile node, to identify wireless fingerprint samples of the collection that match the data elements of the wireless snapshot; and
calculating an estimated location of the particular mobile node using the identified wireless fingerprint sample data.

9. The non-transitory computer-readable medium according to claim 8, wherein each mobile node of the plurality of mobile nodes comprises a wireless access point configured to provide wireless Internet access to end-user devices.

10. The non-transitory computer-readable medium according to claim 8, wherein each node of the plurality of nodes periodically wirelessly broadcasts its current geographic location to other nodes of the network.

11. The non-transitory computer-readable medium according to claim 8, wherein the scanning of RF signals within the service area of the wireless network is without regard to a route of travel of a vehicle in which the mobile node resides.

12. The non-transitory computer-readable medium according to claim 8, the method further comprising:
adding the wireless snapshot and a respective estimated location of the particular mobile node to the collection as a wireless fingerprint sample, if the search fails to identify at least one wireless fingerprint sample that matches the wireless snapshot.

13. The non-transitory computer-readable medium according to claim 8, wherein the collection is indexed according to one or more of the data elements of each wireless fingerprint sample that characterize a signal source.

14. The non-transitory computer-readable medium according to claim 8, wherein the one or more communication interfaces are configured to scan and characterize RF signal sources comprising an RF signal of an IEEE 802.11p compliant vehicle to vehicle wireless communication standard and an RF signal compliant with a commercial cellular communication standard.

15. A system for vehicular positioning of nodes of a radio frequency (RF) wireless network comprising a plurality of nodes disposed at respective fixed locations and a plurality of mobile nodes that reside in respective vehicles that move within a service area of the wireless network, and wherein each node of the plurality of nodes comprises one or more communication interfaces configured for scanning an RF wireless environment of the respective node, the system comprising:
one or more processors operably coupled to storage and communicatively coupled to the plurality of nodes, the one or more processors operable to, at least:
periodically receive respective wireless fingerprint sample data generated by each mobile node of the plurality of mobile nodes, the wireless fingerprint sample data comprising data elements characterizing RF signals received by the mobile node from RF signal sources during scanning of the RF wireless environment of the mobile node and a corresponding geographic location within the service area at which the RF signals were received;
form a collection of the wireless fingerprint sample data received from the plurality of mobile nodes;
receive a request for an estimated geographic location of a particular mobile node of the plurality of mobile nodes;
search the collection using a wireless snapshot comprising data elements characterizing RF signals received in a current RF wireless environment of the particular mobile node, to identify wireless fingerprint samples of the collection that match the data elements of the wireless snapshot; and
calculate an estimated location of the particular mobile node using the identified wireless fingerprint sample data.

16. The system according to claim 15, wherein each mobile node of the plurality of mobile nodes comprises a wireless access point configured to provide wireless Internet access to end-user devices.

17. The system according to claim 15, wherein each node of the plurality of nodes periodically wirelessly broadcasts its current geographic location to other nodes of the network.

18. The system according to claim 15, wherein the scanning of RF signals within the service area of the wireless network is without regard to a route of travel of a vehicle in which the mobile node resides.

19. The system according to claim 15, wherein the one or more processors are further operable to:
add the wireless snapshot and a respective estimated location of the particular mobile node to the collection as a wireless fingerprint sample, if the search fails to identify at least one wireless fingerprint sample that matches the wireless snapshot.

20. The system according to claim 15, wherein the collection is indexed according to one or more of the data elements of each wireless fingerprint sample that characterize a signal source.

21. The system according to claim 15, wherein the one or more communication interfaces are configured to scan and characterize RF signal sources comprising an RF signal of an IEEE 802.11p compliant vehicle to vehicle wireless communication standard and an RF signal compliant with a commercial cellular communication standard.

* * * * *